United States Patent
Jung et al.

(10) Patent No.: US 10,097,041 B2
(45) Date of Patent: Oct. 9, 2018

(54) WIRELESS POWER TRANSMISSION DEVICE AND CONTROL METHOD THEREFOR

(71) Applicant: LG ELECTRONICS INC., Seoul (KR)

(72) Inventors: Byungsang Jung, Seoul (KR); Beomseok Chae, Seoul (KR); Yongcheol Park, Seoul (KR); Kyunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 15/029,741

(22) PCT Filed: Sep. 23, 2014

(86) PCT No.: PCT/KR2014/008853
§ 371 (c)(1),
(2) Date: Apr. 15, 2016

(87) PCT Pub. No.: WO2015/064915
PCT Pub. Date: May 7, 2015

(65) Prior Publication Data
US 2016/0241086 A1    Aug. 18, 2016

Related U.S. Application Data

(60) Provisional application No. 61/906,895, filed on Nov. 21, 2013.

(30) Foreign Application Priority Data

Oct. 31, 2013  (KR) .................... 10-2013-0131454
Jul. 9, 2014    (KR) .................... 10-2014-0086202

(51) Int. Cl.
*H02J 50/12* (2016.01)
*H02J 50/80* (2016.01)

(52) U.S. Cl.
CPC ............. *H02J 50/12* (2016.02); *H02J 50/80* (2016.02)

(58) Field of Classification Search
CPC ........ B60L 11/00; B60L 11/182; H01F 38/00; H01F 38/14; H02J 17/00; H02J 5/00;
(Continued)

(56) References Cited

U.S. PATENT DOCUMENTS

2007/0228833 A1* 10/2007 Stevens .................. H02J 5/005
                                                                              307/45
2009/0134713 A1    5/2009 Stevens et al.

FOREIGN PATENT DOCUMENTS

GB      2398176 A  *  8/2004  ............. H01F 38/14
JP      2009273196       11/2009
(Continued)

OTHER PUBLICATIONS

Korean Intellectual Property Office Serial No. 10-2014-0086202, Office Action dated Jan. 6, 2016, 6 pages.
(Continued)

*Primary Examiner* — Lincoln Donovan
*Assistant Examiner* — David Mattison
(74) *Attorney, Agent, or Firm* — Lee, Hong, Degerman, Kang & Waimey

(57) ABSTRACT

The present specification which relates to a wireless power transmission device and a control method, capable of transmitting and receiving power wirelessly comprises a power supply unit for supplying power to a receiving device to transmit power wirelessly; and a power transmission control unit for, periodically generating a waveform with a particular frequency, measuring an attenuation coefficient of the
(Continued)

waveform at each cycle, measuring a variation in the attenuation coefficient at each cycle, and determining the type of an external material. The present invention has a technical feature wherein the power transmission control unit determines whether to transmit power wirelessly to the receiving device on the basis of the type of the external material.

14 Claims, 27 Drawing Sheets

(58) Field of Classification Search
CPC .. H02J 5/005; H02J 50/00; H02J 50/12; H02J 50/80; H02J 7/00; H02J 7/025
USPC .......................................................... 307/104
See application file for complete search history.

(56) References Cited

FOREIGN PATENT DOCUMENTS

| | | |
|---|---|---|
| JP | 2013135518 | 7/2013 |
| KR | 1020130005570 | 1/2013 |
| KR | 1020130006826 | 1/2013 |
| KR | 1020130038885 | 4/2013 |
| WO | 2005109597 | 11/2005 |

OTHER PUBLICATIONS

PCT International Application No. PCT/KR2014/008853, International Search Report dated Jan. 8, 2015, 3 pages.

\* cited by examiner

FIG. 11
(a) 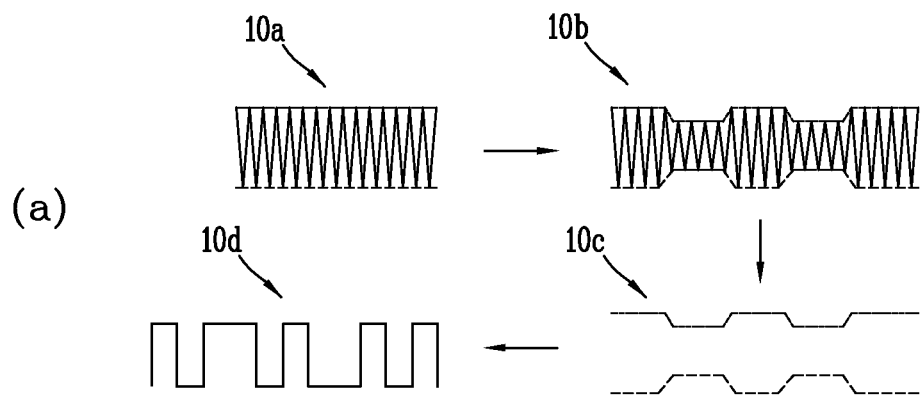
(b) 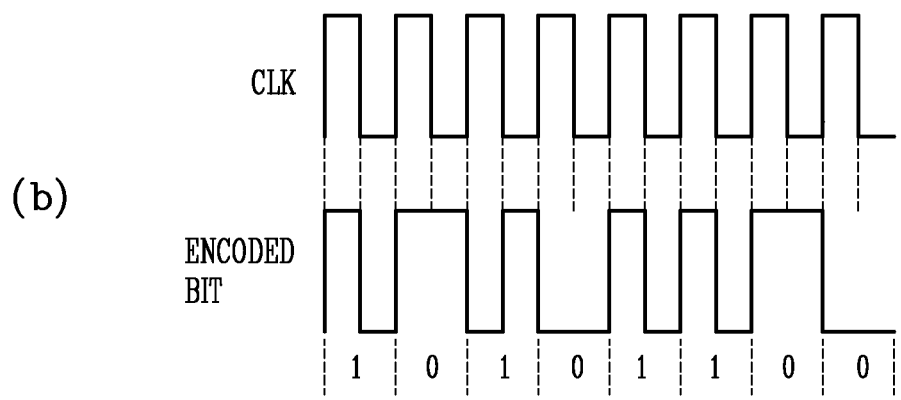
(c) 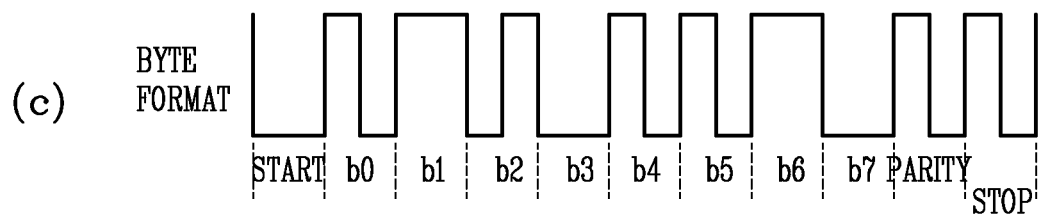

WIRELESS POWER TRANSMISSION DEVICE AND CONTROL METHOD THEREFOR

CROSS-REFERENCE TO RELATED APPLICATIONS

This application is the National Stage filing under 35 U.S.C. 371 of International Application No. PCT/KR2014/008853, filed on Sep. 23, 2014, which claims the benefit of earlier filing date and right of priority to Korean Application Nos. 10-2013-0131454, filed on Oct. 31, 2013 and 10-2014-0086202, filed on Jul. 9, 2014, and also claims the benefit of U.S. Provisional Application No. 61/906,895, filed on Nov. 21, 2013, the contents of which are all hereby incorporated by reference herein in their entirety.

BACKGROUND OF THE INVENTION

1. Field of the Invention

The present disclosure relates to a wireless power transmitter, and a control method thereof.

2. Description of the Related Art

In general, instead of the traditional method of supplying electrical energy to wireless power receivers in a wired manner, in recent years, the method of contactlessly supplying electrical energy to in a wireless manner has been used. The wireless power receiver that receives energy in a wireless manner may be directly driven by the received wireless power, or a battery may be charged using the received wireless power so as to allow the wireless power receiver to be driven by the charged power.

The Wireless Power Consortium dealing with technologies for magnetic induction type wireless power transfer released a standard document "System description Wireless Power Transfer, Volume 1, Low Power, Part 1: Interface Definition, Version 1.00 Release Candidate 1 (RC1)" for interoperability in the wireless power transfer on Apr. 12, 2010. The standard document of the Wireless Power Consortium describes a scheme of transferring power from a wireless power transmitter to a wireless power receiver in a magnetic induction mode.

SUMMARY OF THE INVENTION

An object of the present disclosure is to provide a wireless power transmitter capable of detecting whether or not there exists an external metal material as well as detecting an amount of power consumed by the external metal material, and a control method thereof.

Furthermore, another object of the present disclosure is to provide a wireless power transmitter capable of detecting various information associated with an external material, and a control method thereof.

In addition, still another object of the present disclosure is to provide a wireless power transmitter capable of safely performing one-to-one communication, and a control method thereof.

According to the present disclosure, there is disclosed a wireless power transmitter for transmitting wireless power to an external device to which a wireless power receiver is applied, and the wireless power transmitter may include a power supply unit configured to supply an input voltage, a power transmission control unit configured to generate a drive signal to supply power for the operation of the electronic device, and a power conversion unit configured to form a wireless power signal based on a switching operation due to the supplied input voltage and the drive signal to transmit wireless power to the wireless power receiver, wherein the power transmission control unit detects power lost due to an external metal material, and outputs information indicating the detected power.

For an example associated with the present disclosure, the power transmission control unit may generate error information indicating that power is lost due to the external metal material, and display the error information on a display unit of the wireless power transmitter when power lost due to the external metal material.

For an example associated with the present disclosure, the power transmission control unit may control the wireless power receiver to allow the wireless power receiver to block the reception of the wireless power, and detect a total amount of lost power that is lost from the wireless power transmitter at a time point when an LC resonant circuit of the wireless power transmitter stops while being driven, and determine a difference value between the detected total amount of lost power and an inherent amount of lost power of the wireless power transmitter as an amount of power consumed due to the external metal material.

For an example associated with the present disclosure, the wireless power transmitter may further include a display unit configured to display an amount of power consumed by the external metal material.

For an example associated with the present disclosure, the power transmission control unit may detect the total amount of lost power based on a frequency value for driving an LC resonant circuit of the wireless power transmitter, an inductor (L) value of the LC resonant circuit of the wireless power transmitter, and a current value of the LC resonant circuit of the wireless power transmitter.

For an example associated with the present disclosure, the current value of the LC resonant circuit of the wireless power transmitter may indicate a difference value between a first current value of the inductor (L) detected at a first time point when a first predetermined time or a predetermined number of cycles has passed from a time point when the LC resonant circuit of the wireless power transmitter stops while being driven and a second current value of the inductor (L) detected at a second time point when a second predetermined time or a predetermined number of cycles has passed from a time point when the LC resonant circuit of the wireless power transmitter stops while being driven, and the first time point is earlier than the second time point.

For an example associated with the present disclosure, in a state that the wireless power receiver is not connected to the wireless power transmitter, the power transmission control unit may detect an attenuation factor of resonant energy in the LC resonant circuit of the wireless power transmitter at a time point when the driving of the LC resonant circuit of the wireless power transmitter, and determine whether or not there exists the external metal material based on the detected attenuation factor and reference attenuation factor.

For an example associated with the present disclosure, in a state that the wireless power receiver is connected to the wireless power transmitter, the power transmission control unit may control the wireless power receiver to allow the wireless power receiver to block the reception of the wireless power, and detect an attenuation factor of resonant energy in the LC resonant circuit of the wireless power transmitter at a time point when the driving of the LC resonant circuit of the wireless power transmitter, and determine whether or not there exists the external metal material based on the detected attenuation factor and reference attenuation factor.

For an example associated with the present disclosure, the power transmission control unit may detect power causing the heat generation of the external metal material.

According to the present disclosure, there is disclosed a method of controlling a wireless power transmitter configured to transmit wireless power to an electronic device to which a wireless power receiver is applied, the control method may include generating a drive signal to supply power for the operation of the electronic device; forming a wireless power signal based on a switching operation due to an input voltage and the drive signal to transmit wireless power to the wireless power receiver; detecting power lost due to an external metal material; and outputting information indicating the detected power.

According to the present disclosure, there is disclosed a wireless power transmitter capable of transmitting and receiving power in a wireless manner, and the wireless power transmitter may include a power supply unit configured to supply power to transmit power to a receiver in a wireless manner, and a power transmission control unit configured to periodically generate a waveform at a specific frequency to measure an attenuation factor of the waveform for each period, and measure a variation of the attenuation factor for the each period to determine the type of an external material, wherein the power transmission control unit determines whether or not to transmit power to the receiver in the wireless manner based on the type of the external material.

For an example associated with the present disclosure, the power transmission control unit may detect a variation of an attenuation factor changed according to the period of the waveform, and determine the external material as a receiver that receives power in the wireless manner to transmit power to the receiver in a wireless manner when the variation of the attenuation factor corresponds to a preset reference variation.

For an example associated with the present disclosure, the wireless power transmitter may further include a wireless communication unit formed to perform communication with the receiver in a wireless manner, wherein the power transmission control unit transmits a preset amount of power and control information associated with communication to the receiver to perform communication through the wireless communication unit when the external material is a receiver that receives the wireless power.

For an example associated with the present disclosure, the power transmission control unit may transmit power to the receiver in a wireless manner when one-to-one communication with the receiver is completed.

For an example associated with the present disclosure, the power transmission control unit may receive amount-of-power information on wireless power to be received from the receiver through the connected communication to control the power supply unit so as to supply power based on the amount-of-power information.

For an example associated with the present disclosure, the power transmission control unit may suspend power that has been supplied to the receiver upon receiving alignment state information indicating that the alignment state of the receiver has been changed from the receiver through the connected communication.

For an example associated with the present disclosure, when a frequency different from a preset resonant frequency is detected subsequent to periodically generating the waveform at the specific frequency, the power transmission control unit may determine the type of an external material based on the characteristics of the different frequency.

For an example associated with the present disclosure, the power transmission control unit may detect the type of the external material based on the characteristics of the different frequency, and determine an amount of power to be transmitted in a wireless manner based on the type of the external material.

For an example associated with the present disclosure, the power transmission control unit may detect a capacitance of the external material based on a variation of the attenuation factor of the different frequency.

According to the present disclosure, there is disclosed a wireless charging system for transmitting power in a wireless manner, and the wireless charging system may include a transmitter formed to transmit power in a wireless manner, and a receiver formed to receive wireless power from the transmitter, wherein the transmitter includes a power supply unit configured to supply power to transmit power to the receiver in a wireless manner, and a power transmission control unit configured to periodically generate a waveform at a specific frequency to measure an attenuation factor of the waveform for each period, and measure a variation of the attenuation factor for the each period to determine whether or not to transmit power in a wireless manner to the receiver.

For an example associated with the present disclosure, the transmitter may further include a wireless communication unit formed to perform communication with the receiver in a wireless manner, wherein the power transmission control unit transmits communication information and a preset amount of power to the receiver to perform communication with the receiver in a wireless manner prior to transmitting power to the receiver in a wireless manner.

For an example associated with the present disclosure, the power transmission control unit may transmit the communication information and preset amount of power using a frequency higher than a resonant frequency of the transmitter.

For an example associated with the present disclosure, when communication is connected to the receiver based on the communication information, the power transmission control unit may control the power supply unit to transmit power based on an amount of power received from the receiver through the communication.

For an example associated with the present disclosure, when a request signal for suspending power transmission is received from the receiver, the power transmission control unit may control the power supply unit to suspend the power being transmitted.

For an example associated with the present disclosure, the receiver may generate the request signal based on at least one of a voltage value, a voltage drop time and a current value of the receiver.

According to the present disclosure, there is disclosed a wireless power transmission method of a wireless power transmitter for transmitting power in a wireless manner, an the wireless power transmission method may include periodically generating a waveform at a specific frequency; sensing a power receiver that receives power in a wireless manner based on a variation of an attenuation factor for each period of the waveform at the specific frequency; transferring communication connection information and power to be used for a communication module of a receiver to the power receiver to communicate with the transmitter when the power receiver is detected; connecting communication to the receiver using the communication connection information; and receiving amount-of-power information to be transmitted from the receiver in a wireless manner using the connected communication, and transmitting power in a wireless manner based on the received amount-of-power information, wherein said sensing the power receiver periodically generates the waveform at the specific frequency, and measures an attenuation factor for the period to detect a receiver using a variation of a plurality of attenuation factors.

For an example associated with the present disclosure, said sensing the power receiver may determine an alignment state of the receiver using a waveform having a frequency different from a resonant frequency of the transmitter.

For an example associated with the present disclosure, said transferring the communication connection information to the power receiver may transfer the communication connection information using a frequency higher than that of a resonant frequency of the transmitter.

For an example associated with the present disclosure, the transmitter may communicate with the receiver in a one-to-one manner.

For an example associated with the present disclosure, said transmitting power to the receiver in a wireless manner may suspend the transmission of the power based on a request signal for suspending the transmission of power that is received from the receiver through the communication.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 11 is a view illustrating the concept of transmitting and receiving a packet between a wireless power transmitter and an electronic device through the modulation and demodulation of a wireless power signal in wireless power transfer disclosed herein;

DETAILED DESCRIPTION OF THE INVENTION

Figure 1:
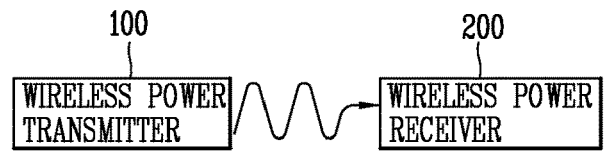
FIG. 1 is an exemplary view conceptually illustrating a wireless power transmitter and an electronic device according to the embodiments of the present invention.

The technologies disclosed herein may be applicable to wireless power transfer (contactless power transfer). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly.

Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Definition

Many-to-one communication method: A method of communicating between one transmitter (Tx) and many receivers (Rx).

Unidirectional communication method: A communication method of transmitting a required message only from a receiver to a transmitter.

Bidirectional communication method: A communication method of transmitting a message from a transmitter to a receiver, from the receiver to the transmitter, namely, from both sides.

Here, the transmitter and the receiver indicate the same as a transmitting unit (device) and a receiving unit (device), respectively. Hereinafter, those terms may be interchangeably used.

Conceptual View of Wireless Power Transmitter and Wireless Power Receiver

FIG. 1 is an exemplary view conceptually illustrating a wireless power transmitter and a wireless power receiver according to the embodiments of the present invention.

Referring to FIG. 1, the wireless power transmitter 100 may be a power transfer apparatus configured to transfer power required for the wireless power receiver 200 in a wireless manner.

Furthermore, the wireless power transmitter 100 may be a wireless charging apparatus configured to charge a battery of the wireless power receiver 200 by transferring power in a wireless manner. A case where the wireless power transmitter 100 is a wireless charging apparatus will be described later with reference to FIG. 9.

Additionally, the wireless power transmitter 100 may be implemented with various forms of apparatuses transferring power to the wireless power receiver 200 requiring power in a contactless state.

The wireless power receiver 200 is a device that is operable by receiving power from the wireless power transmitter 100 in a wireless manner. Furthermore, the wireless power receiver 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, and a tablet and the like) or a multimedia device.

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

Figure 2:
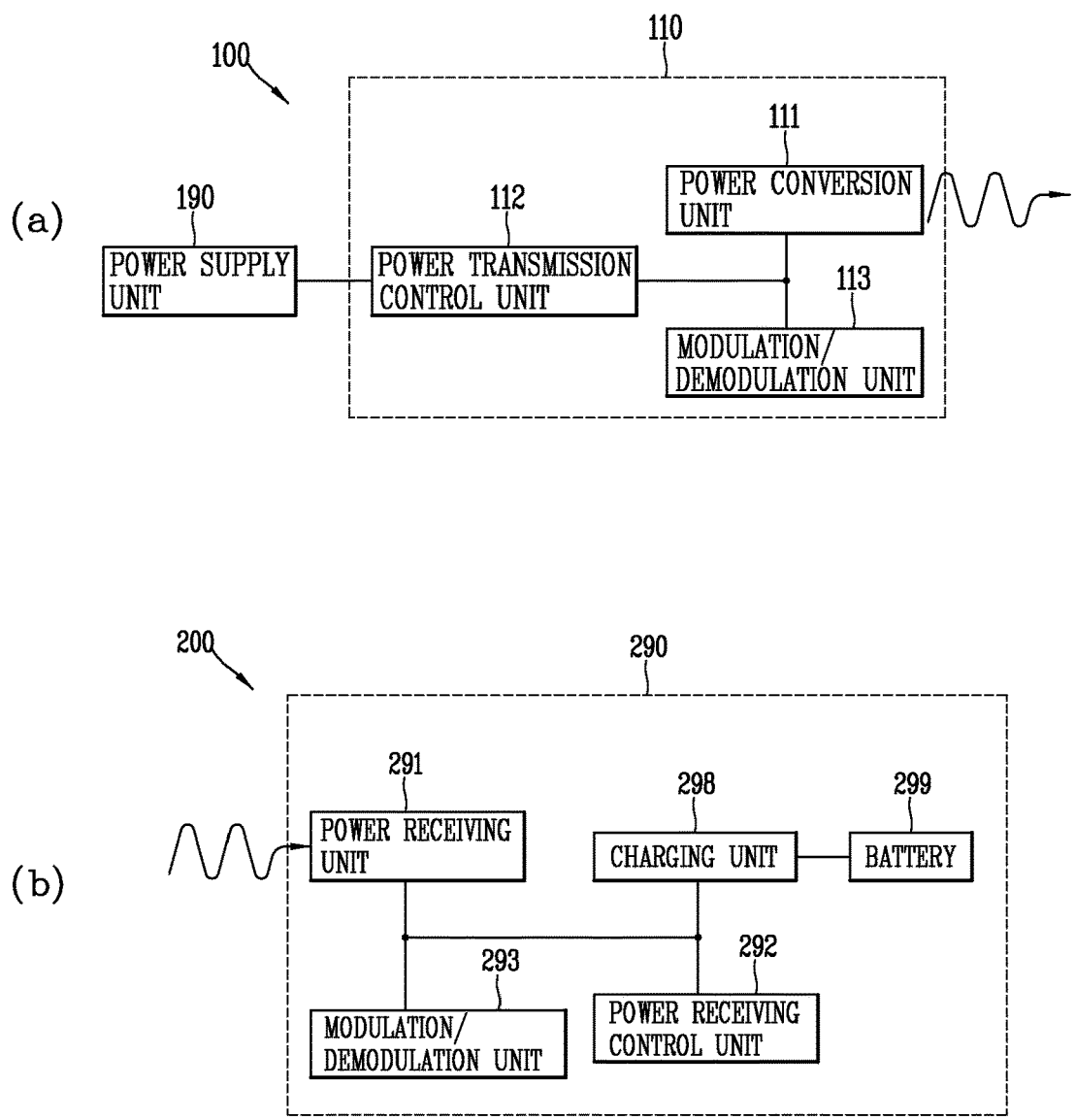
FIGS. 2A and 2B are exemplary block diagrams illustrating the configuration of a wireless power transmitter and an electronic device that can be employed in the embodiments disclosed herein, respectively.

FIGS. 2A and 2B are exemplary block diagrams illustrating the configuration of a wireless power transmitter 100 and a wireless power receiver 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonant frequency to generate a resonant frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110 The power transmission control unit 112 may be implemented to be integrated into another control unit (not shown) for controlling the wireless power transmitter 100.

On the other hand, a region to which the wireless power signal can be approached may be divided into two types.

First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the wireless power receiver 200 and use it to receive the power control message.

In addition, the power transmission control unit 112 may acquire a power control message by receiving user data including a power control message by a communication means (not shown) included in the wireless power transmitter 100.

[In Case of Supporting in-Band Two-Way Communication]

Under a wireless power transfer environment allowing for bi-directional communications according to the exemplary embodiments disclosed herein, the power transmission control unit 112 may transmit data to the wireless power receiver 200. The data transmitted by the power transmission control unit 112 may be transmitted to request the wireless power receiver 200 to send the power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIG. 4, and those for the resonance coupling method with reference to FIG. 7.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through at least one of the wireless power signal and user data.

In order to transmit the foregoing power control message, the wireless power receiver 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power reception control unit 292 controls the power communications modulation/demodulation unit 293 at the side of the wireless power receiver 200 to modulate the wireless power signal. For instance, the power reception control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the wireless power receiver 200.

[In Case of Supporting in-Band Two-Way Communication]

Under a wireless power transfer environment allowing for bi-directional communications according to the exemplary embodiments disclosed herein, the power reception control unit 292 may receive data to the wireless power transmitter 100. The data transmitted by the wireless power transmitter 100 may be transmitted to request the wireless power receiver 200 to send the power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and a wireless power receiver applicable to the exemplary embodiments disclosed herein. First, a method of allowing the wireless power transmitter to transfer power to the electronic device according to the inductive coupling method will be described with reference to FIGS. 3 through 5.

Inductive Coupling Method

Figure 3:
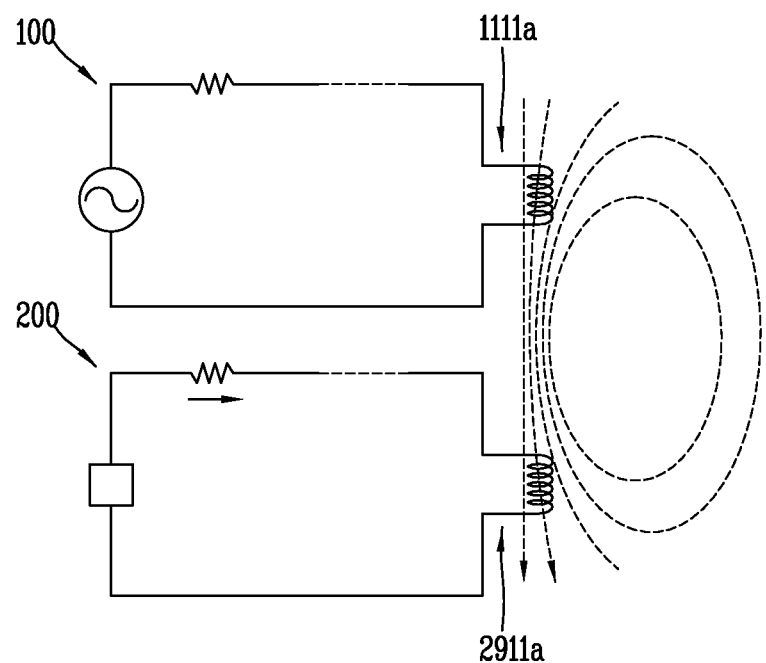
FIG. 3 is a view illustrating a concept in which power is transferred from a wireless power transmitter to an electronic device in a wireless manner according to an inductive coupling method.

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111a being operated as a primary coil in magnetic induction. Furthermore, the power receiving unit 291 of the wireless power receiver 200 may include a receiving (Rx) coil 2911a being operated as a secondary coil in magnetic induction.

First, the wireless power transmitter 100 and wireless power receiver 200 are disposed in such a manner that the transmitting coil 1111a at the side of the wireless power transmitter 100 and the receiving coil at the side of the wireless power receiver 200 are located adjacent to each other. Then, if the power transmission control unit 112 controls a current of the transmitting coil (Tx coil) 1111a to be changed, then the power receiving unit 291 controls power to be supplied to the wireless power receiver 200 using an electromotive force induced to the receiving coil (Rx coil) 2911a.

The efficiency of wireless power transfer by the inductive coupling method may be little affected by a frequency characteristic, but affected by an alignment and distance between the wireless power transmitter 100 and the wireless power receiver 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111a may be mounted at a lower portion of the interface surface. In this case, a vertical spacing is formed in a small-scale between the transmitting coil 1111a mounted at a lower portion of the interface surface and the receiving coil 2911a of the wireless power receiver 200 placed at an upper portion of the interface surface, and thus a distance between the coils becomes sufficiently small to efficiently implement contactless power transfer by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111a mounted at a lower portion of the interface surface and the receiving coil 2911a can be suitably implemented. The alignment indicator may alternatively be simple marks, or may be formed in the form of a protrusion structure for guiding the location of the wireless power receiver 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911a of the wireless power receiver 200 among the one or more transmitting coils to enhance the power transmission efficiency. The wireless power transmitter 100 including the one or more transmitting coils will be described later with reference to FIG. 5.

Hereinafter, configurations of the wireless power transmitter and electronic device using an inductive coupling method applicable to the embodiments disclosed herein will be described in detail.

Figure 4A:
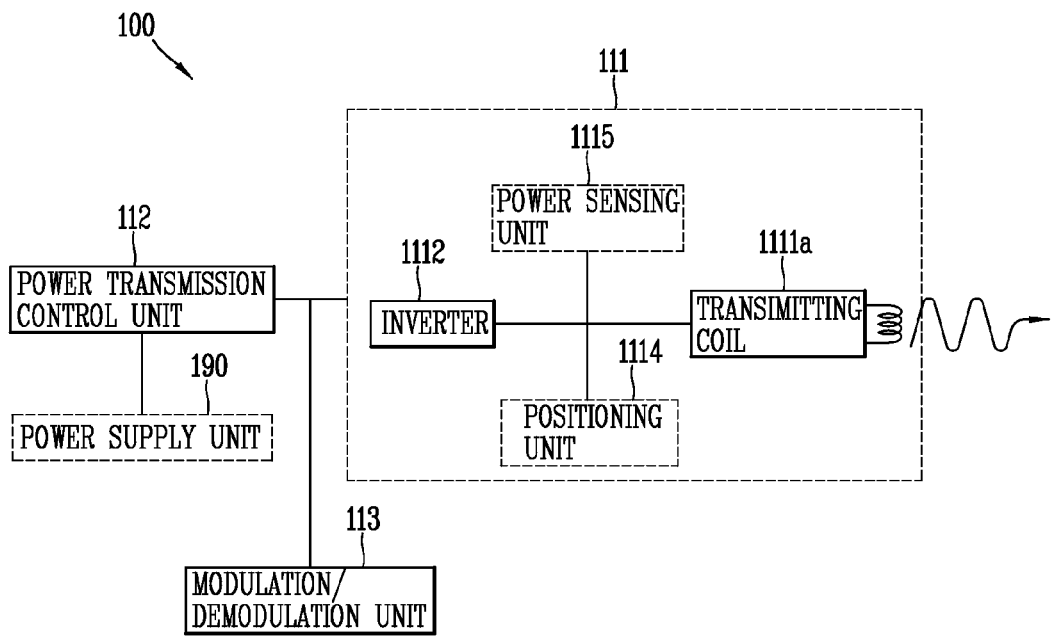
FIGS. 4A and 4B are block diagrams illustrating part of a wireless power transmitter and an electronic device in a magnetic induction method that can be employed in the embodiments disclosed herein.
Figure 4B:
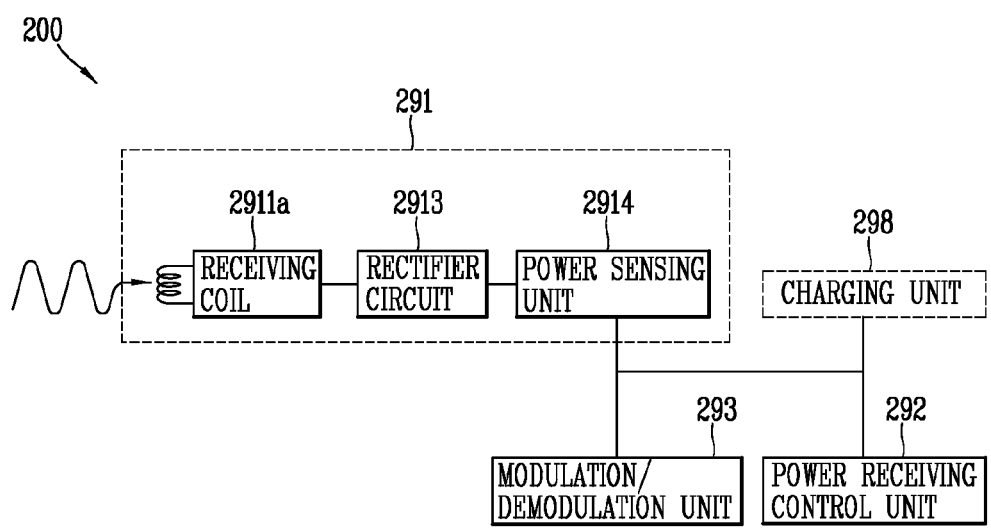

Wireless Power Transmitter and Wireless Power Receiver in Inductive Coupling Method FIGS. 4A and 4B are block diagrams illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111a and an inverter 1112.

The transmitting coil 1111a may form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 may further include a positioning unit 1114.

The positioning unit 1114 may move or rotate the transmitting coil 1111a to enhance the effectiveness of contactless power transfer using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111a such that a center-to-center distance of the transmitting coil 1111a of the wireless power transmitter 100 and the receiving coil 2911a of the wireless power receiver 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111a.

Referring to FIG. 4B, the power supply unit 290 of the wireless power receiver 200 may include a receiving (Rx) coil 2911a and a rectifier 2913.

A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be configured to be connected to the receiving coil 2911a to enhance the effectiveness of wireless power reception or perform resonant detection.

The receiving coil 2911a may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Wireless Power Transmitter Configured to Include One or More Transmitting Coils

Figure 5:
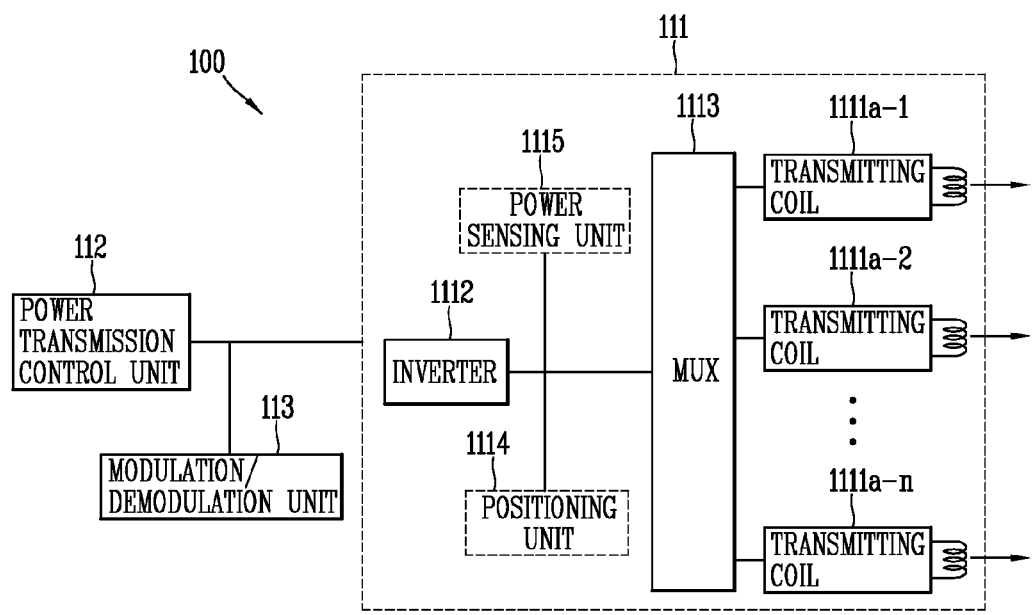
FIG. 5 is a block diagram illustrating a wireless power transmitter configured to have one or more transmission coils receiving power according to an inductive coupling method that can be employed in the embodiments disclosed herein.

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911a of the wireless power receiver 200 among the one or more transmitting coils 1111a-1 to 1111a-n to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911a of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

Figure 6:
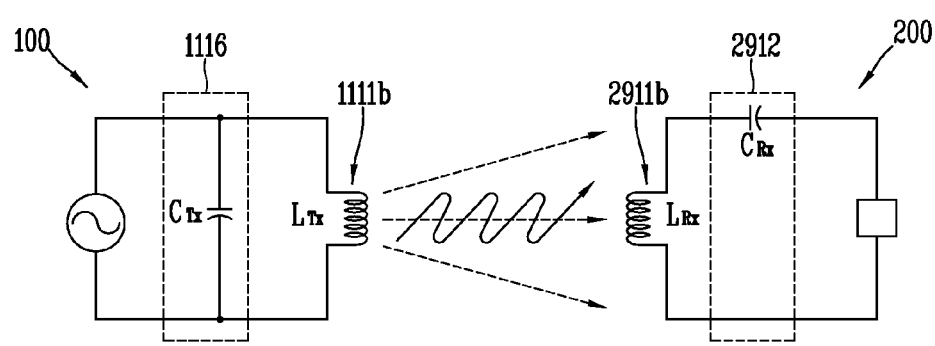
FIG. 6 is a view illustrating a concept in which power is transferred to an electronic device from a wireless power transmitter in a wireless manner according to a resonance coupling method.

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonant frequency may be determined by the following formula in Equation 1.

$$f = \frac{1}{2\pi\sqrt{LC}}$$ [Equation 1]

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the wireless power receiver 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have LTX, CTX, and may be acquired by using the Equation 1. Here, the wireless power receiver 200 generates resonance when a result of substituting the LRX and CRX of the wireless power receiver 200 to the Equation 1 is same as the specific vibration frequency.

According to a contactless power transfer method by resonance coupling, when the wireless power transmitter 100 and wireless power receiver 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and an electronic device in the resonance coupling method applicable to the embodiments disclosed herein will be described in detail.

Wireless Power Transmitter in Resonance Coupling Method

FIG. 7 is a block diagram illustrating part of the wireless power transmitter 100 and wireless power receiver 200 in a resonance method that can be employed in the embodiments disclosed herein.

Figure 7A:
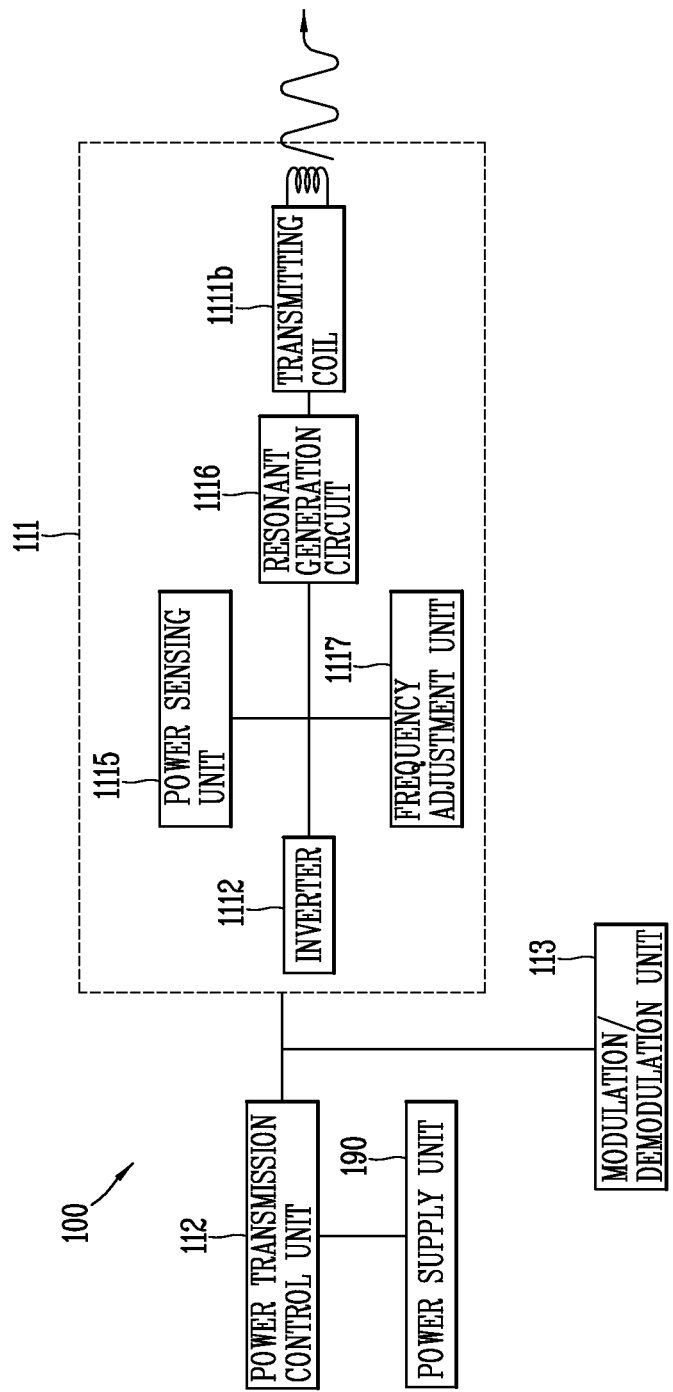
FIGS. 7A and 7B are block diagrams exemplarily illustrating part of a wireless power transmitter and an electronic device in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Figure 7B:
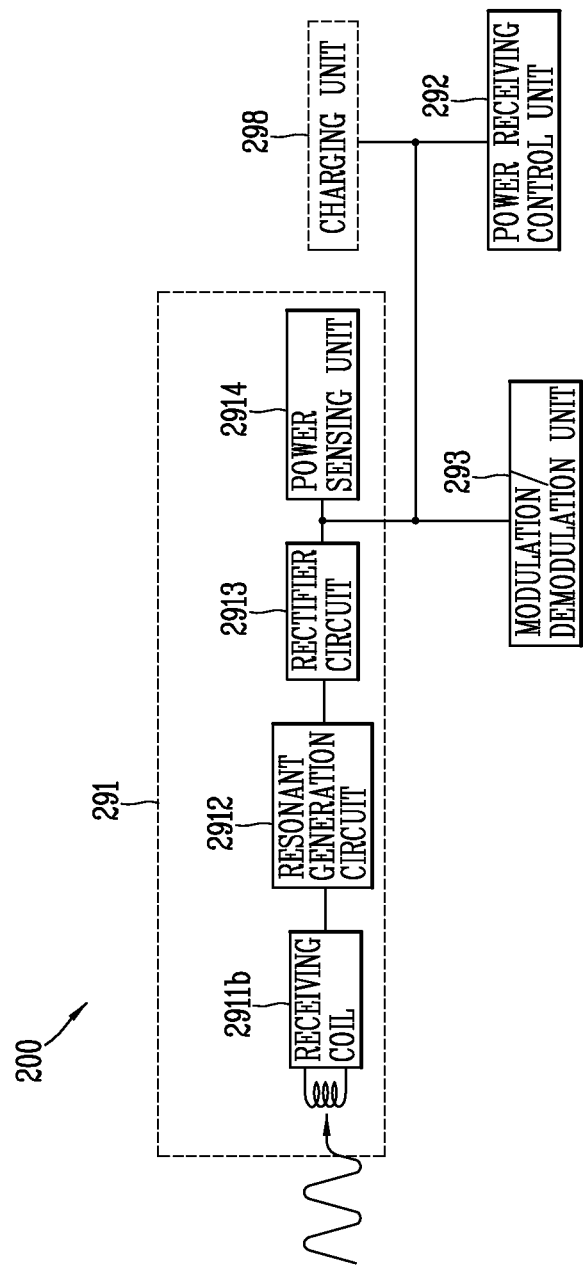

Referring to FIG. 7B, a configuration of the power supply unit 290 included in the wireless power receiver 200 will be described. The power supply unit 290, as described above, may include the receiving (Rx) coil 2911b and resonant circuit 2912.

In addition, the power receiving unit 291 of the power supply unit 290 may further include a rectifier 2913 for converting an AC current generated by resonance phenomenon into DC. The rectifier 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless Power Transmitter Configured to Include One or More Transmitting Coils

Figure 8:
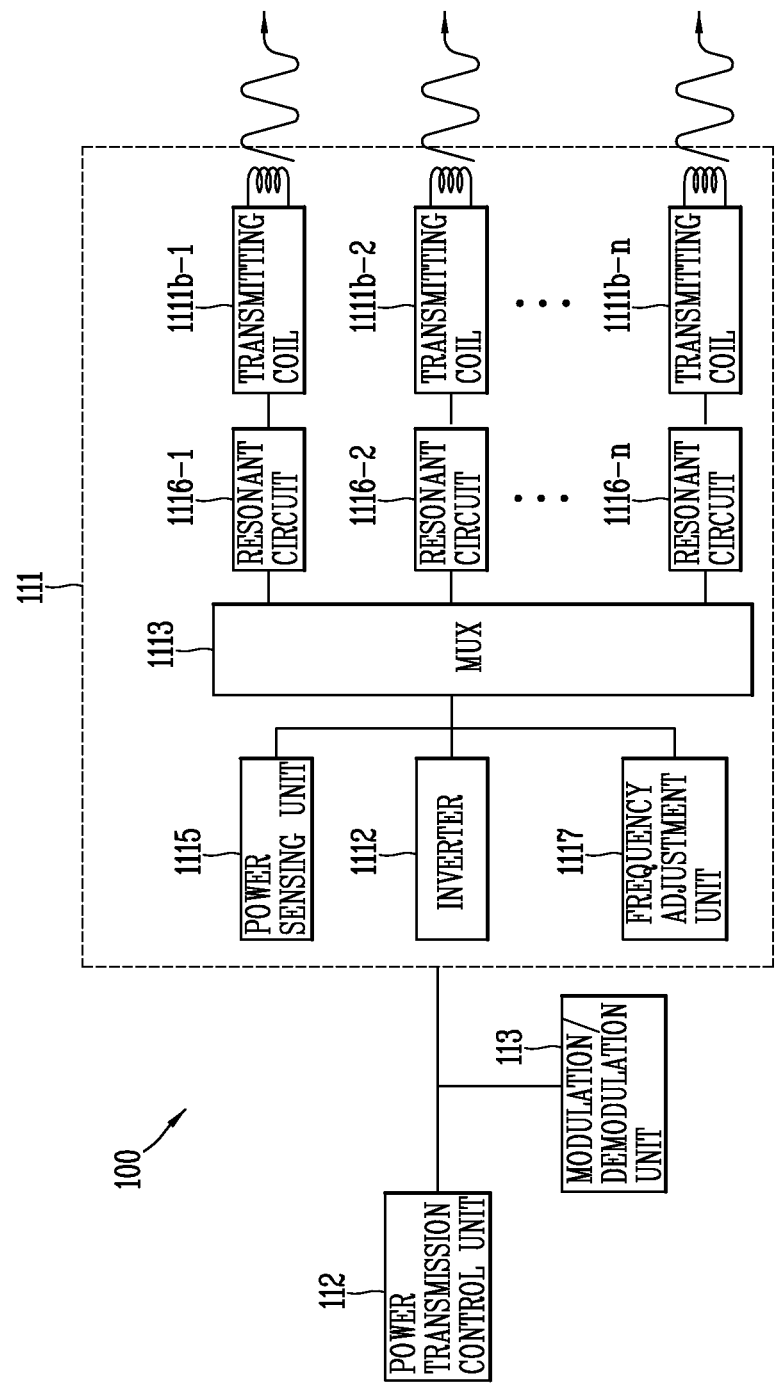
FIG. 8 is a block diagram illustrating a wireless power transmitter configured to have one or more transmission coils receiving power according to a resonance coupling method that can be employed in the embodiments disclosed herein.

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

In-Band Communication

Figure 9:
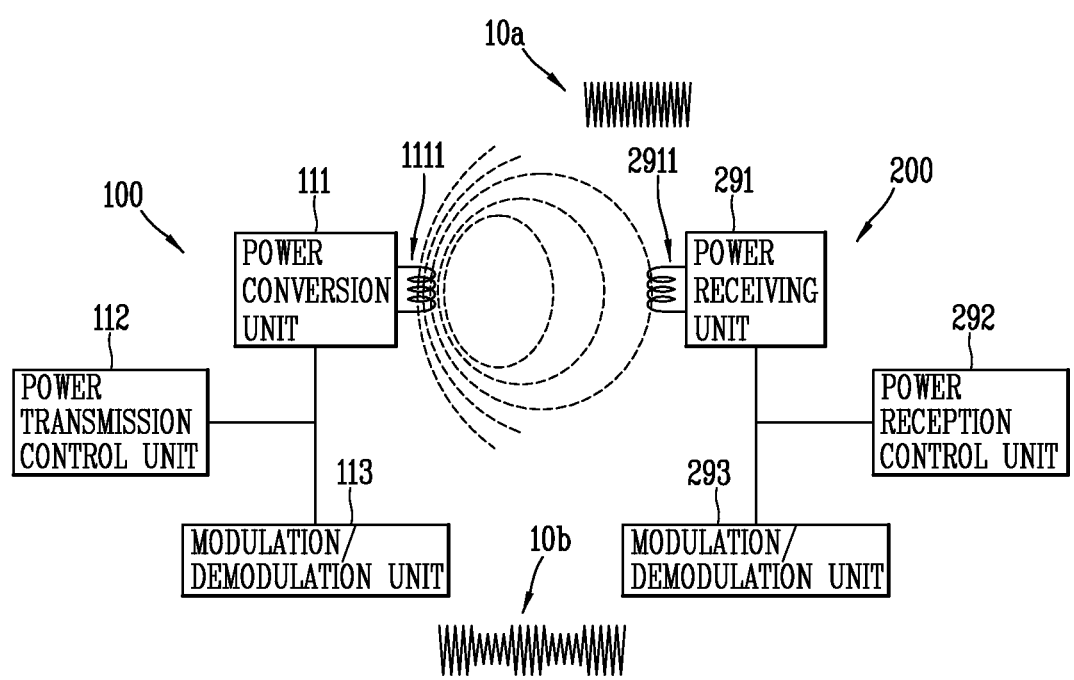
FIG. 9 is a block diagram illustrating a wireless power transmitter further including an additional element in addition to the configuration illustrated in FIG. 2A.

FIG. 9 a view illustrating the concept of transmitting and receiving a packet between a wireless power transmitter and a wireless power receiver through the modulation and demodulation of a wireless power signal in transferring power in a wireless manner disclosed herein.

As illustrated in FIG. 9, the power conversion unit 111 included in the wireless power transmitter 100 may generate a wireless power signal. The wireless power signal may be generated through the transmitting coil 1111 included in the power conversion unit 111.

The wireless power signal 10a generated by the power conversion unit 111 may arrive at the wireless power receiver 200 so as to be received through the power receiving unit 291 of the wireless power receiver 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the wireless power receiver 200 receives the wireless power signal. When the received wireless power signal is modulated, the wireless power signal may form a closed-loop within a magnetic field or an electro-magnetic field. This may allow the wireless power transmitter 100 to sense a modulated wireless power signal 10b. The modulation/demodulation unit 113 may demodulate the sensed wireless power signal and decode the packet from the demodulated wireless power signal.

The modulation method employed for the communication between the wireless power transmitter 100 and the wireless power receiver 200 may be an amplitude modulation. As aforementioned, the amplitude modulation is a backscatter modulation may be a backscatter modulation method in which the power communications modulation/demodulation unit 293 at the side of the wireless power receiver 200 changes an amplitude of the wireless power signal 10a formed by the power conversion unit 111 and the power reception control unit 292 at the side of the wireless power transmitter 100 detects an amplitude of the modulated wireless power signal 10b.

Modulation and Demodulation of Wireless Power Signal

Hereinafter, description will be given of modulation and demodulation of a packet, which is transmitted or received between the wireless power transmitter 100 and the wireless power receiver 200 with reference to FIGS. 10 and 11.

Figure 10:
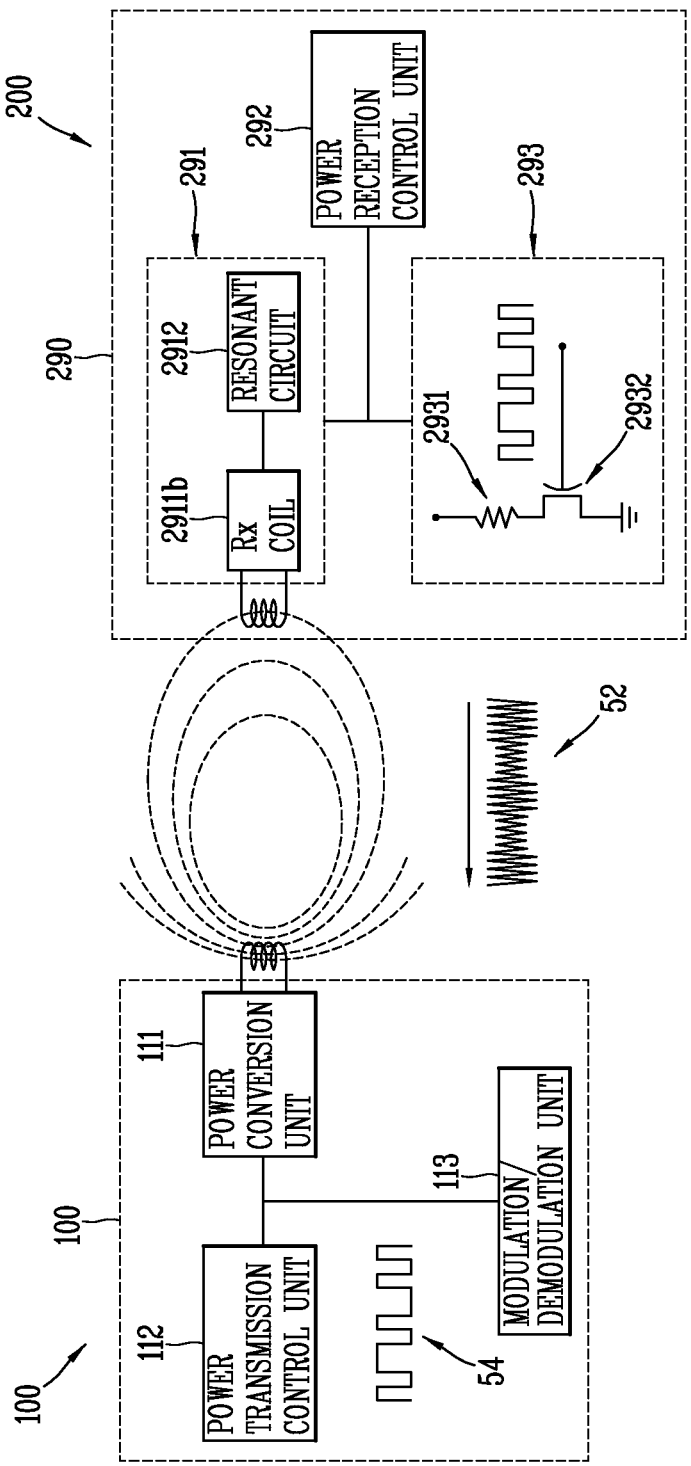
FIG. 10 is view illustrating a configuration in case where an electronic device according to the embodiments disclosed herein is implemented in the form of a mobile terminal.

FIG. 10 is a view illustrating a configuration of transmitting or receiving a power control message in transferring power in a wireless manner disclosed herein, and FIG. 11 is a view illustrating forms of signals upon modulation and demodulation executed in the wireless power transfer disclosed herein.

Referring to FIG. 10, the wireless power signal received through the power receiving unit 291 of the wireless power receiver 200, as illustrated in FIG. 11A, may be a non-modulated wireless power signal 51. The wireless power receiver 200 and the wireless power transmitter 100 may establish a resonance coupling according to a resonant frequency, which is set by the resonant circuit 2912 within the power receiving unit 291, and the wireless power signal 51 may be received through the receiving coil 2911b.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelop detection, and decode the detected signal 53 into digital data 54. The demodulation may detect a current or voltage flowing into the power conversion unit 111 to be classified into two states, a HI phase and a LO phase, and acquire a packet to be transmitted by the wireless power receiver 200 based on digital data classified according to the states.

Hereinafter, a process of allowing the wireless power transmitter 100 to acquire a power control message to be transmitted by the wireless power receiver 200 from the demodulated digital data will be described.

Referring to FIG. 11B, the power transmission control unit 112 detects an encoded bit using a clock signal (CLK) from an envelope detected signal. The detected encoded bit is encoded according to a bit encoding method used in the modulation process at the side of the wireless power receiver 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power receiver 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 12C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[In Case of Supporting in-Band Two-Way Communication]

As aforementioned, FIG. 9 has illustrated that the wireless power receiver 200 transmits a packet using a carrier signal 10a formed by the wireless power transmitter 100. However, the wireless power transmitter 100 may also transmit data to the wireless power receiver 200 by a similar method.

That is, the power transmission control unit 112 may control the modulation/demodulation unit 113 to modulate data, which is to be transmitted to the wireless power receiver 200, such that the data can be included in the carrier signal 10a. Here, the power reception control unit 292 of the wireless power receiver 200 may control the modulation/demodulation unit 293 to execute demodulation so as to acquire data from the modulated carrier signal 10a.

Packet Format

Hereinafter, description will be given of a structure of a packet used in communication using a wireless power signal according to the exemplary embodiments disclosed herein.

Figure 12:
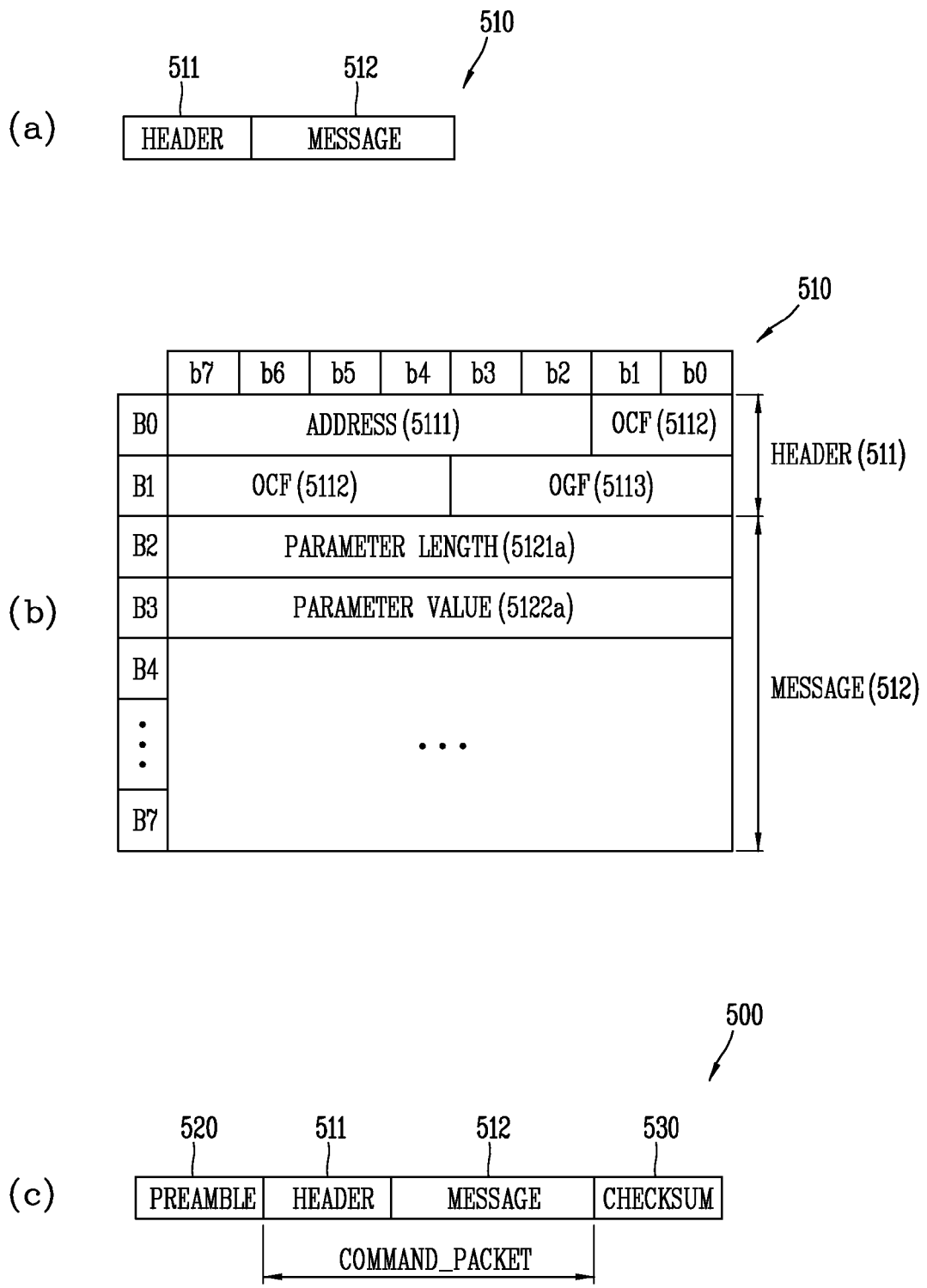
FIG. 12 is a view illustrating a method of showing data bits and byte constituting a power control message provided by the wireless power transmitter 100.

FIG. 12 is a view illustrating a packet including a power control message used in a contactless (wireless) power transfer method according to the embodiments disclosed herein.

As illustrated in FIG. 12A, the wireless power transmitter 100 and the wireless power receiver 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

The header 511 may include an address field for identifying a transmitter (originator) of the packet. For example, the address field may indicate an identifier of the wireless power receiver 200 or an identifier of a group to which the wireless power receiver 200 belongs. When the wireless power receiver 200 transmits the packet 510, the wireless power receiver 200 may generate the packet 510 such that the address field can indicate identification information related to the receiver 200 itself.

The message 512 may include data that the originator of the packet 510 desires to transmit. The data included in the message 512 may be a report, a request or a response for the other party.

According to one exemplary embodiment, the command packet 510 may be configured as illustrated in FIG. 12B. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the wireless power receiver 200, and the OCF is a value given for each command existing in each group in which the wireless power receiver 200 is included.

The message 512 may be divided into a length field 5121 of a parameter and a value field 5122 of the parameter. That is, the originator of the packet 510 may generate the message by a length-value pair (5121a-5122a, etc.) of at least one parameter, which is required to represent data desired to transmit.

Referring to FIG. 12C, the wireless power transmitter 100 and the wireless power receiver 200 may transmit and receive the data in a form of a packet which further has a preamble 520 and a checksum 530 added to the command packet 510.

The preamble 520 may be used to perform synchronization with data received by the wireless power transmitter 100 and detect the start bit of the header 520. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, description will be given of operation phases of the wireless power transmitter 100 and the wireless power receiver 200.

Figure 13:
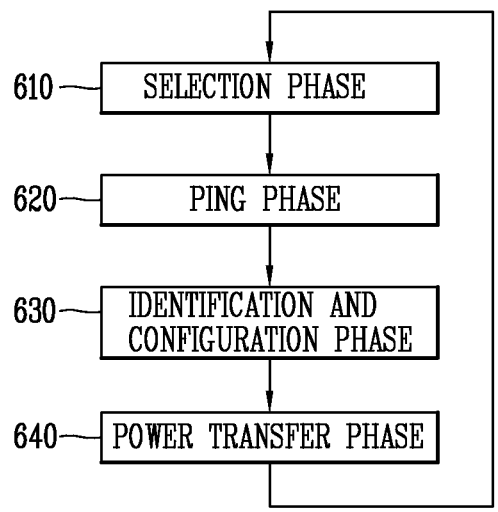
FIG. 13 is a view illustrating a packet including a power control message used in a wireless power transfer method according to the embodiments disclosed herein.
Figure 14:
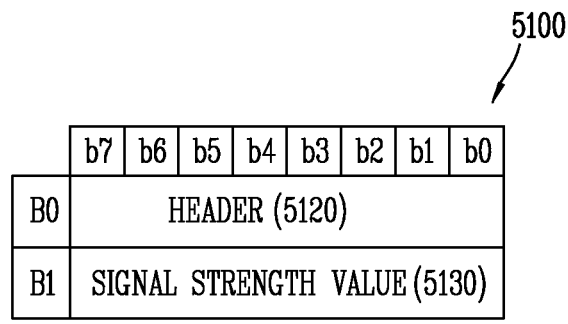
FIG. 14 is a view illustrating the operation phases of a wireless power transmitter and an electronic device according to the embodiments disclosed herein.

FIG. 13 illustrates the operation phases of the wireless power transmitter 100 and the wireless power receiver 200 according to the embodiments disclosed herein. Furthermore, FIGS. 14 to 18 illustrate the structures of packets including a power control message between the wireless power transmitter 100 and the wireless power receiver 200.

Referring to FIG. 13, the operation phases of the wireless power transmitter 100 and the wireless power receiver 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection state 610, and the wireless power transmitter 100 sends a detection signal to the detected object and the wireless power receiver 200 sends a response to the detection signal in the ping state 620.

Furthermore, the wireless power transmitter 100 identifies the wireless power receiver 200 selected through the previous states and acquires configuration information for power transmission in the identification and configuration state 630. The wireless power transmitter 100 transmits power to the wireless power receiver 200 while controlling power transmitted in response to a control message received from the wireless power receiver 200 in the power transfer state 640.

Hereinafter, each of the operation phases will be described in detail.

1) Selection State

The wireless power transmitter 100 in the selection state 610 performs a detection process to select the wireless power receiver 200 existing within a detection area. The detection area, as described above, refers to a region in which an object within the relevant area can affect on the characteristic of the power of the power conversion unit 111.

Compared to the ping state 620, the detection process for selecting the wireless power receiver 200 in the selection state 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message. The detection process in the selection state 610 may be referred to as an analog ping process in the aspect of detecting an object using a wireless power signal without using a packet in a digital format in the ping state 620 which will be described later.

The wireless power transmitter 100 in the selection state 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection state 610 may be different from one another.

First, in case where power is transmitted according to the inductive coupling method, the wireless power transmitter 100 in the selection state 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the ping state 620 in the selection state 610, and checking whether or not a response to the detection signal is transmitted from the object using each coil in the ping state 620 or subsequently entering the identification state 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection state 610 can detect an object by detecting that any one of a frequency, a current and a voltage of the power conversion unit is changed due to an object located within the detection area.

On the other hand, the wireless power transmitter 100 in the selection state 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other states 620, 630, 640.

On the other hand, for the wireless power transmitter 100, a wireless power signal formed to detect an object in the selection state 610 and a wireless power signal formed to perform digital detection, identification, configuration and power transmission in the subsequent states 620, 630, 640 may have a different characteristic in the frequency, strength, and the like. It is because the selection state 610 of the wireless power transmitter 100 corresponds to an idle state for detecting an object, thereby allowing the wireless power transmitter 100 to reduce consumption power in the idle state or generate a specialized signal for effectively detecting an object.

2) Ping State

The wireless power transmitter 100 in the ping state 620 performs a process of detecting the wireless power receiver 200 existing within the detection area through a power control message. Compared to the detection process of the wireless power receiver 200 using a characteristic of the wireless power signal and the like in the selection state 610, the detection process in the ping state 620 may be referred to as a digital ping process.

The wireless power transmitter 100 in the ping state 620 forms a wireless power signal to detect the wireless power receiver 200, modulates the wireless power signal modulated by the wireless power receiver 200, and acquires a power control message in a digital data format corresponding to a response to the detection signal from the modulated wireless power signal. The wireless power transmitter 100 may receive a power control message corresponding to the response to the detection signal to recognize the wireless power receiver 200 which is a subject of power transmission.

The detection signal formed to allowing the wireless power transmitter 100 in the ping state 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

Figure 15A:
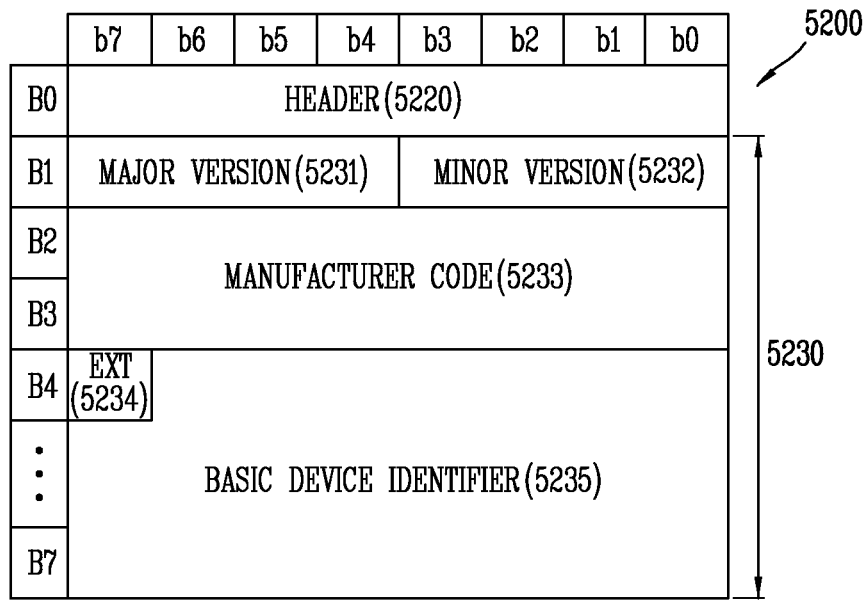
FIGS. 15 through 19 are views illustrating the structure of packets including a power control message between the wireless power transmitter and electronic device.
Figure 15B:
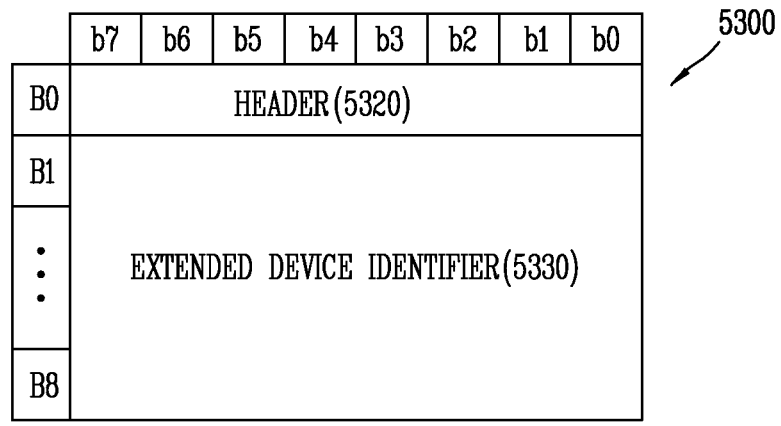
Figure 16:
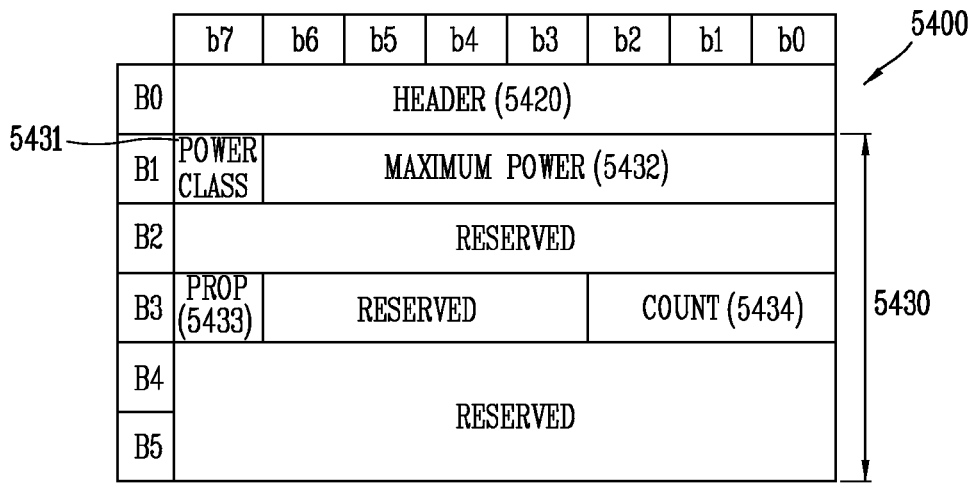

On the other hand, the power control message corresponding to a response to the detection signal may be a message indicating strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 15. The packet 5100 may include a header 5120 for notifying a packet indicating the signal strength and a message 5130 indicating strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the identification and configuration state 630. In other words, the wireless power transmitter 100 maintains the power signal at a specific operating point subsequent to finding the wireless power receiver 200 to receive a power control message required in the identification and configuration state 630.

However, if the wireless power transmitter 100 is not able to find the wireless power receiver 200 to which power can be transferred, then the operation phase of the wireless power transmitter 100 will be returned to the selection state 610.

3) Identification and Configuration State

The wireless power transmitter 100 in the identification and configuration state 630 may receive identification information and/or configuration information transmitted by the wireless power receiver 200, thereby controlling power transmission to be effectively carried out.

The wireless power receiver 200 in the identification and configuration state 630 may transmit a power control message including its own identification information. For this purpose, the wireless power receiver 200, for instance, may transmit an identification packet 5200 including a message indicating the identification information of the wireless power receiver 200 as illustrated in FIG. 16A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 16B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

Figure 17:
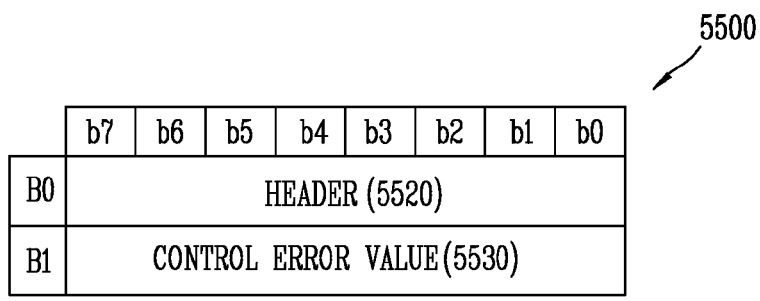

The wireless power receiver 200 may transmit a power control message including information on expected maximum power in the identification and configuration state 630. To this end, the wireless power receiver 200, for instance, may transmit a configuration packet 5400 as illustrated in FIG. 17. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

On the other hand, the wireless power transmitter 100 may generate a power transfer contract which is used for power charging with the wireless power receiver 200 based on the identification information and/or configuration information. The power transfer contract may include the limits of parameters determining a power transfer characteristic in the power transfer state 640.

The wireless power transmitter 100 may terminate the identification and configuration state 630 and return to the selection state 610 prior to entering the power transfer state 640. For instance, the wireless power transmitter 100 may terminate the identification and configuration state 630 to find another electronic device that can receive power in a wireless manner.

4) Power Transfer State

The wireless power transmitter 100 in the power transfer state 640 transmits power to the wireless power receiver 200.

Figure 18:
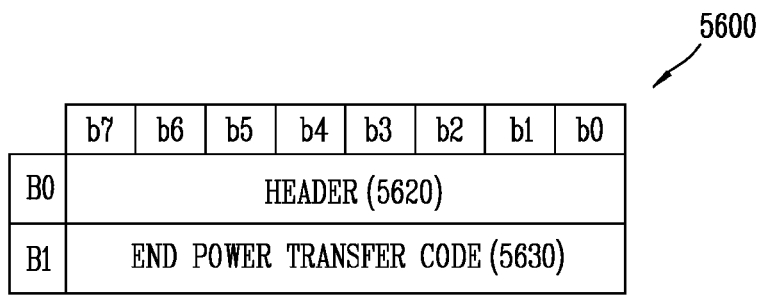

The wireless power transmitter 100 may receive a power control message from the wireless power receiver 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 18. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0," reduced if the control error value is a negative value, and increased if the control error value is a positive value.

The wireless power transmitter 100 may monitor parameters within a power transfer contract generated based on the identification information and/or configuration information in the power transfer state 640. As a result of monitoring the parameters, if power transmission to the wireless power receiver 200 violates the limits included in the power transfer contract, then the wireless power transmitter 100 may cancel the power transmission and return to the selection state 610.

The wireless power transmitter 100 may terminate the power transfer state 640 based on a power control message transferred from the wireless power receiver 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection state 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration state 630.

Figure 20:
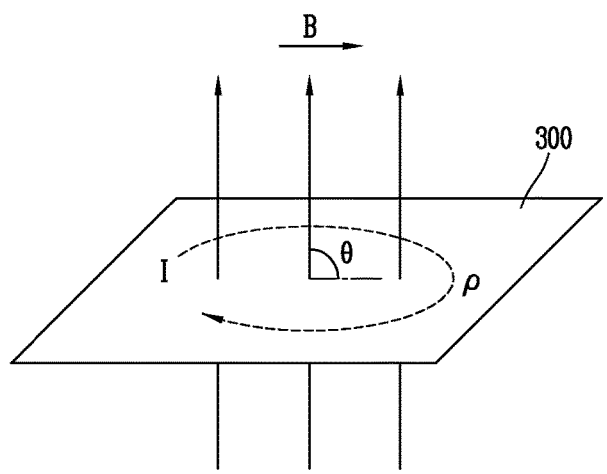
FIG. 20 is an exemplary view illustrating the heating cause of an external metal material located at the wireless power transmitter 100 according to an embodiment of the present disclosure.

To this end, a message transmitted by the wireless power receiver 200, for instance, may be an end power transfer packet 5600 as illustrated in FIG. 20. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of Plural Electronic Devices

Hereinafter, description will be given of a method by which at least one electronic device performs communication with one wireless power transmitter using wireless power signals.

Figure 19:
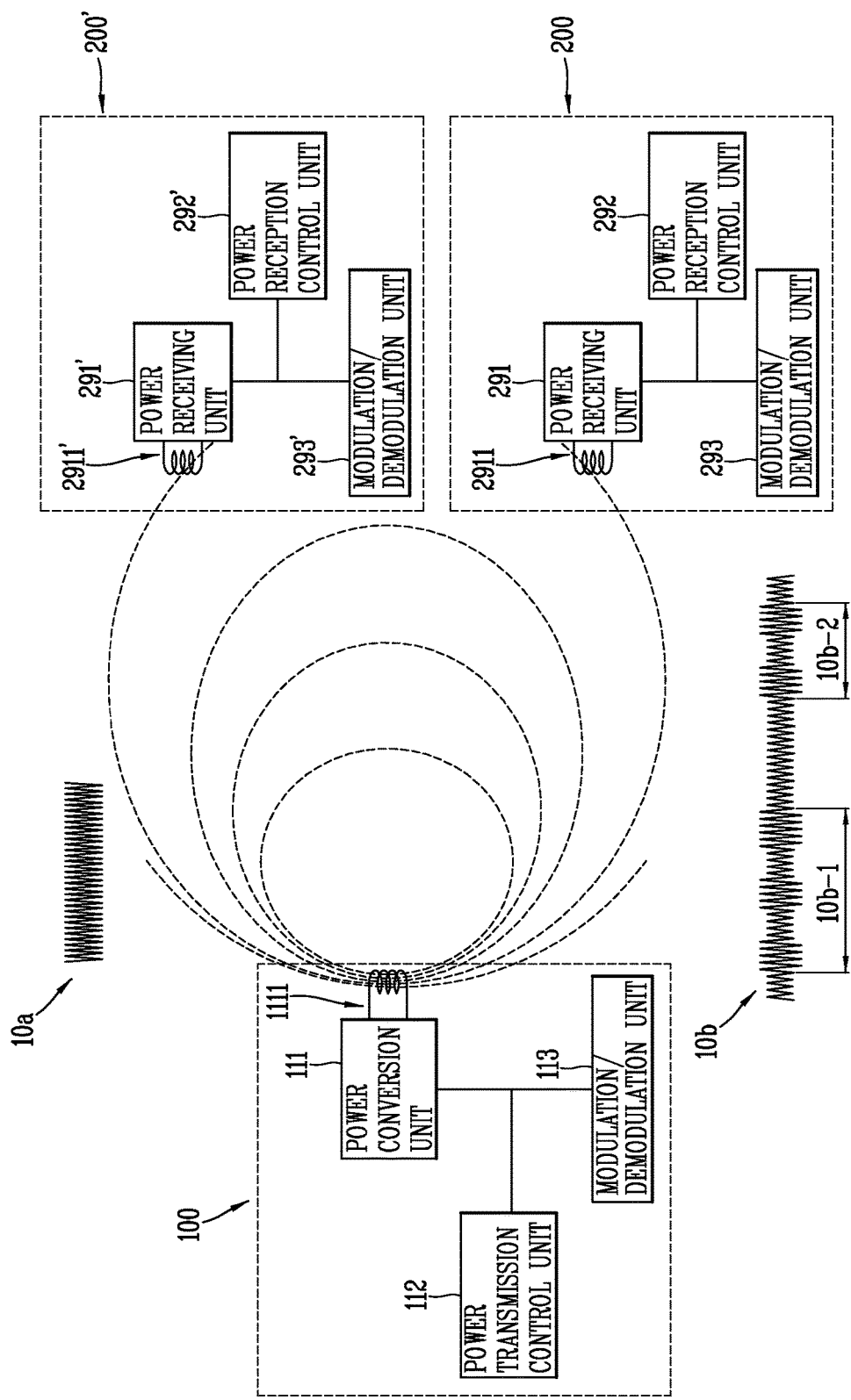

FIG. 19 is a conceptual view illustrating a method of transferring power to at least one wireless power receiver from a wireless power transmitter.

The wireless power transmitter 100 may transmit power to one or more wireless power receivers 200 and 200'. FIG. 19 illustrates two electronic devices 200 and 200', but the methods according to the exemplary embodiments disclosed herein may not be limited to the number of electronic devices shown.

An active area and a detection area may be different according to the wireless power transfer method of the wireless power transmitter 100. Therefore, the wireless power transmitter 100 may determine whether there is a wireless power receiver located on the active area or the detection area according to the resonance coupling method or a wireless power receiver located on the active area or the detection area according to the induction coupling method. According to the determination result, the wireless power transmitter 100 which supports each wireless power transfer method may change the power transfer method for each wireless power receiver.

In the wireless power transfer according to the exemplary embodiments disclosed herein, when the wireless power transmitter 100 transfers power to the one or more electronic devices 200 and 200' according to the same wireless power transfer method, the electronic devices 200 and 200' may perform communications through the wireless power signals without inter-collision.

Referring to FIG. 19, a wireless power signal 10a generated by the wireless power transmitter 100 may arrive at the first electronic device 200' and the second electronic device 200, respectively. The first and second electronic devices 200' and 200 may transmit wireless power messages using the generated wireless power signal 10a.

The first electronic device 200' and the second electronic device 200 may operate as wireless power receivers for receiving a wireless power signal. The wireless power receiver in accordance with the exemplary embodiments disclosed herein may include a power receiving unit 291', 291 to receive the generated wireless power signal, a modulation/demodulation unit 293', 293 to modulate or demodulate the received wireless power signal, and a controller 292', 292 to control each component of the wireless power receiver.

The foregoing description has been given of the wireless power transmission and reception method based on the WPC standard. In addition, the present disclosure proposes a method in which a wireless power transmitter wirelessly transfers power to each of wireless power receivers, which comply with (support) different standards, so as to be appropriate for each standard. Furthermore, the present disclosure provides a new type of multi-coil solution, capable of being interoperable with a WPC standard and a PMA standard and extending a degree of position freedom of receivers. Hereinafter, detailed description thereof will be given.

On the other hand, according to a method of transmitting and receiving wireless power using a linkage flux between the wireless power transmitter 100 and the wireless power receiver 200, when an external metal material (for example, a metal material (conductor) such as a metal cup, can or the like) is located at a position adjacent to the wireless power transmitter 100 and/or the wireless power receiver 200, the external metal material may generate heat by a magnetic flux.

FIG. 20 is an exemplary view illustrating the heating cause of an external metal material 300 located at the wireless power transmitter 100 according to an embodiment of the present disclosure.

As illustrated in FIG. 20, when a magnetic flux (B) passes through the external metal material (conductor) 300, a current (I) in proportion to a sine value of an angle (Θ) between a surface of the external metal material 300 and the magnetic flux is induced, and the current (I) causes heating in proportion to a resistance value calculated from the resistivity coefficient (ρ) of the external metal material 300.

Accordingly, the present disclosure describes an apparatus and a method thereof for measuring a substantial amount of power capable of causing the heating of the external metal material 300 from wireless power transmitted from the wireless power transmitter 100. Furthermore, the present disclosure also describes an apparatus and a method thereof for measuring a substantial amount of power capable of causing the heating of the external metal material 300 only on the wireless power transmitter 100 in a circumstance with no effect of the wireless power receiver 200 to solve a compatibility problem. For example, the present disclosure determines the existence or non-existence of an external metal material capable of causing heating based on an amount of attenuation of resonant energy of the wireless power transmitter 100 when the operation of the transmitting coil 1111 is suspended in the wireless power transmission system 100, 200 using the linkage flux. Furthermore, it is set to a condition that the energy of the wireless power receiver 200 is not consumed to remove the effect of the wireless power receiver 200.

Figure 21:
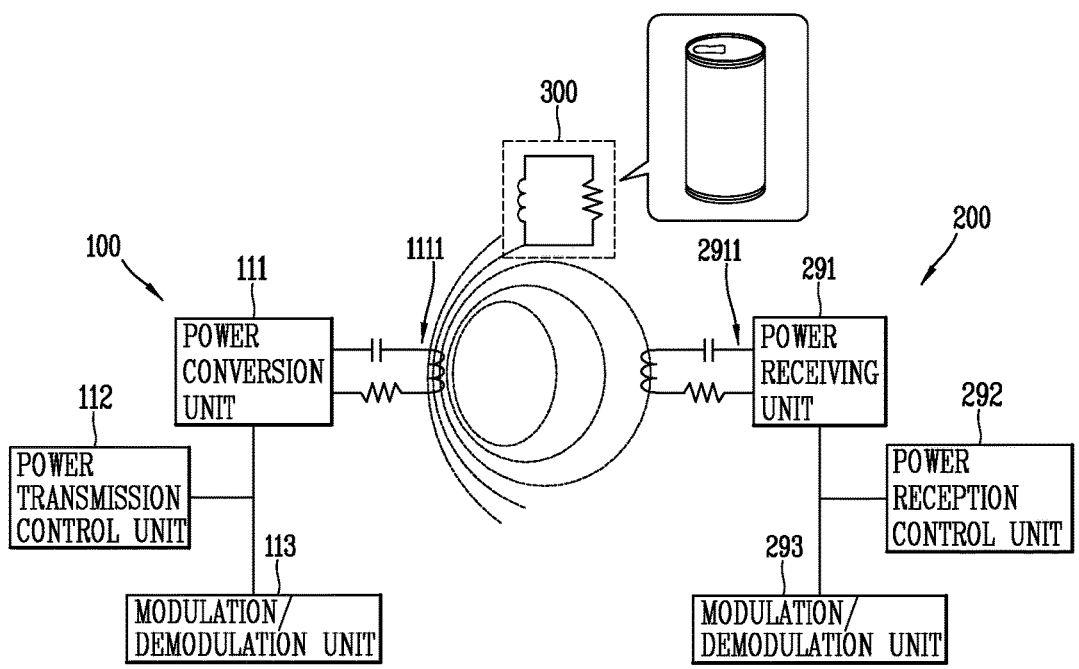
FIG. 21 is an exemplary view illustrating an external metal material located between the wireless power transmitter and the wireless power receiver using a linkage flux according to an embodiment of the present disclosure.

FIG. 21 is an exemplary view illustrating an external metal material located between the wireless power transmitter 100 and the wireless power receiver 200 using a linkage flux according to an embodiment of the present disclosure.

As illustrated in FIG. 21, the wireless power transmitter 100 may include a transmitting coil 1111 configured with an LC resonant circuit to which a capacitor (C) is connected in series or parallel, and the wireless power receiver 200 may include a receiving coil 2911 to which a capacitor (C) is connected in series or parallel. It is based on a principle that power is transmitted to the wireless power receiver 200 due to a component in linkage with the receiving coil 2911 on a magnetic flux generated when the power conversion unit 111 applies AC power to the transmitting coil 1111. The transmitting coil 1111 and receiving coil 2911 is configured with a LC resonant circuit (or resonance tank) to which the capacitor (C) is connected in series or parallel, and sufficient power may be transmitted to the wireless power receiver 200 by adjusting an impedance using the LC resonant circuit.

A resonant circuit configured with the inductor (L) and capacitor (C) resonates while the L and C give and take energy to and from each other. Then, an inverter within the power conversion unit 111 performs the role of driving the LC resonant circuit at a resonant frequency or at a frequency higher than the resonant frequency in a steady state in which energy (power) is transmitted in a wireless manner.

Figure 22A:
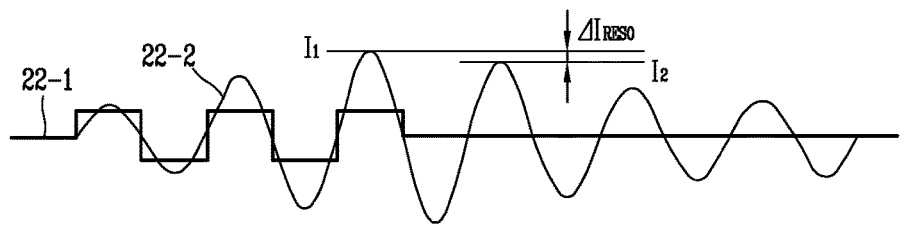
FIGS. 22A and 22B are exemplary views illustrating a current change of an inductor (L) when an inverter of the wireless power transmitter temporarily suspends the operation while driving an LC resonant circuit.
Figure 22B:
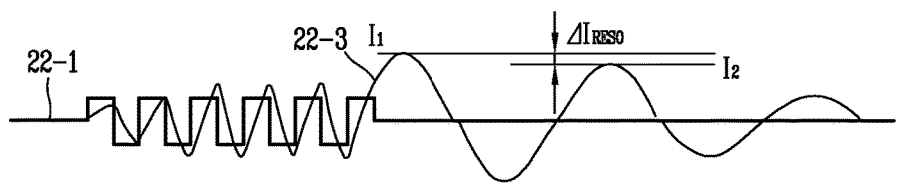

FIGS. 22A and 22B are exemplary views illustrating a current change ($\Delta I_{RESO}$) of an inductor (L) when an inverter of the wireless power transmitter 100 suddenly (temporarily) suspends the operation while driving an LC resonant circuit. FIG. 22A illustrates a current change of an inductor (L) when an inverter of the wireless power transmitter 100 suspends the operation while driving an LC resonant circuit of the wireless power transmitter 100 at a resonant frequency 22-2, and FIG. 22B illustrates a current change of an inductor (L) when an inverter of the wireless power transmitter 100 suspends the operation while driving an LC resonant circuit of the wireless power transmitter 100 at a frequency 22-3 higher than the resonant frequency 22-2. Reference numeral 22-1 indicates a driving voltage (current) of the LC resonant circuit. In other words, it is seen that a current change ($\Delta I_{RESO}$) of the inductor (L) is the same (no change) even when the operation is temporarily suspended while driving the LC resonant circuit at a resonant frequency 22-2 or at a frequency 22-3. higher than the resonant frequency 22-2.

As illustrated in FIGS. 22A and 22B, when an inverter of the wireless power transmitter 100 suspends the operation while driving the LC resonant circuit, the resonant energy of the resonant circuit of the wireless power transmitter 100 gradually decreases. Taking a current of L for a value representing the energy of the LC resonant circuit of the wireless power transmitter 100 as an example, when the current of L is changed from a first current ($I_1$) to a second current ($I_2$) based on a value the following Equation 2 is established.

$$\Delta P = \frac{1}{2} f L_{COIL}(I_1^2 - I_2^2) = kP_T + P_{LOSS} + P_{FO} \qquad \text{Equation 2}$$

Here, ΔP indicates an overall amount of lost power lost from the wireless power transmitter 100, and f indicates a frequency at which the LC resonant circuit is driven, and $L_{COIL}$ indicates an inductor (L) value of an LC resonant circuit of the wireless power transmitter 100, and $I_1$ indicates a first current of the inductor (L) detected at a first time point at which a first predetermined period of time (or predetermined number of cycles) has passed from a time point at which the LC resonant circuit of the wireless power transmitter 100 is driven and then suspended, and $I_2$ indicates a second current of the inductor (L) detected at a second time point at which a second predetermined period of time (or predetermined number of cycles) has passed from a time point at which the LC resonant circuit of the wireless power transmitter 100 is driven and then suspended, and the first time point is set to be earlier than the second time point. The first and the second predetermined time is contained within a period of time from a time point at which the LC resonant circuit of the wireless power transmitter 100 is suspended to a time point at which a current of the inductor (L) is no longer detected.

$kP_T$ is an amount of power transmitted to the wireless power receiver 200, wherein a coefficient of k is shown because the wireless power receiver 200 also has an LC resonant circuit. $P_{LOSS}$ as an inherent amount of power lost from the wireless power transmitter 100 indicates an inherent amount of power lost from the wireless power transmitter 100 due to an element (irrelevant to an external metal material) generated by a parasitic resistance, a loss of the core of the wireless power transmitter 100, and the like. $P_{FO}$ indicates an amount of power lost from the wireless power transmitter 100 due to heat generation from an external metal material or the like. Here, the transmission control unit 112 may obtain a total amount of lost power (ΔP) lost from the wireless power transmitter 100, an inherent amount of power ($P_{LOSS}$) lost from the wireless power transmitter 100, an amount of lost power ($P_{FO}$) or the like due to heat generation from the external metal material, and the like when the inverter of the wireless power transmitter 100 suspends the operation while driving the LC resonant circuit.

The transmission control unit 112 is set to a state in which $P_T=0$, and determines a value obtained by multiplying a value obtained by subtracting the second current ($I_2$) from the first current ($I_1$) during a predetermined period of time (or predetermined number of cycles) from a time point at which the LC resonant circuit of the wireless power transmitter 100 is driven and then suspended by a result value of $$"\frac{1}{2} f L_{COIL}".$$

Figure 23:
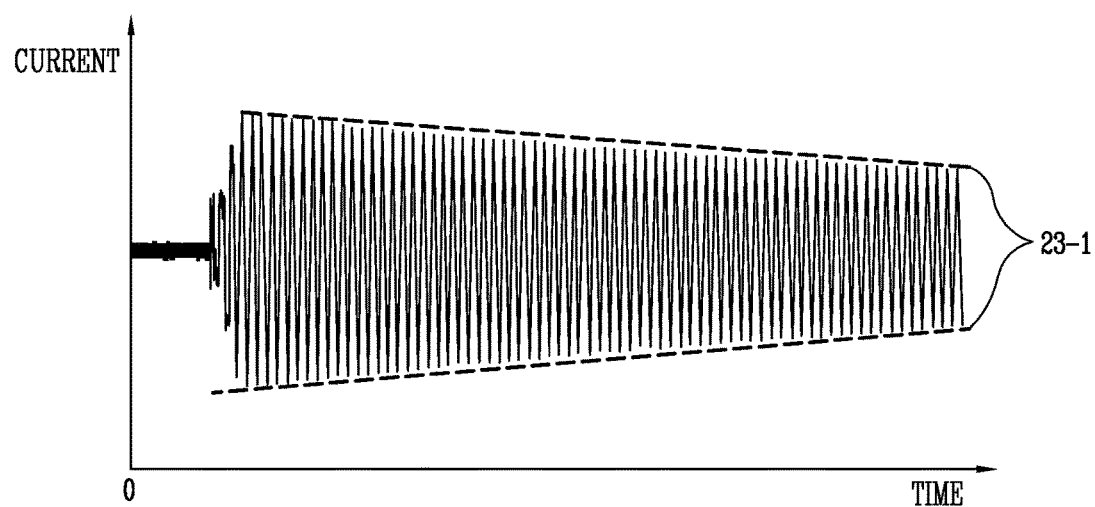
FIG. 23 illustrates an attenuation curve of resonant energy when the operation of an LC resonant circuit of the wireless power transmitter in a state that only there exists the wireless power transmitter without the wireless power receiver 200 and external metal material.

FIG. 23 illustrates an attenuation curve 23-1 of resonant energy when the operation of an LC resonant circuit of the wireless power transmitter 100 in a state that only there exists the wireless power receiver 200 and external metal material 300.

As illustrated in FIG. 23, it is seen that an envelop temporally decreases along $e^{-\alpha t}$ with an attenuation factor ($\alpha$). The attenuation factor is a value based on $P_{LOSS}$, and elements associated with $P_{LOSS}$ are intrinsic loss components irrelevant to an external metal material such as an equivalent resistance of a coil, a magnetic resistance generated from a coil core, a loss generated from an assembly of the wireless power transmitter 100, and the like, and an inherent amount of power ($P_{LOSS}$) lost from the wireless power transmitter 100 may be obtained in advance by measuring the wireless power transmitter 100 alone.

When the wireless power receiver 200 is connected to the wireless power transmitter 100, the transmission control unit 112 generates a control signal (control signal for setting to $P_T=0$) for suspending the operation of the LC resonant circuit of the wireless power receiver 200, and transmits the control signal (control signal for setting to $P_T=0$) to the wireless power receiver 200. The wireless power receiver 200 suspends the operation of its own LC resonant circuit based on the control signal (control signal for setting to $P_T=0$) (set to $P_T=0$). The transmission control unit 112 may generate a control signal for suspending the operation of the LC resonant circuit of the wireless power receiver 200 and transmit the control signal to the wireless power receiver 200 in a periodic manner or whenever a period of time set by the user has passed to detect the existence or non-existence of the external metal material 300 and/or an amount of power consumed due to the external metal material 300.

Hereinafter, a method of setting $P_T=0$ will be described with reference to FIGS. 24 and 25.

Figure 24:
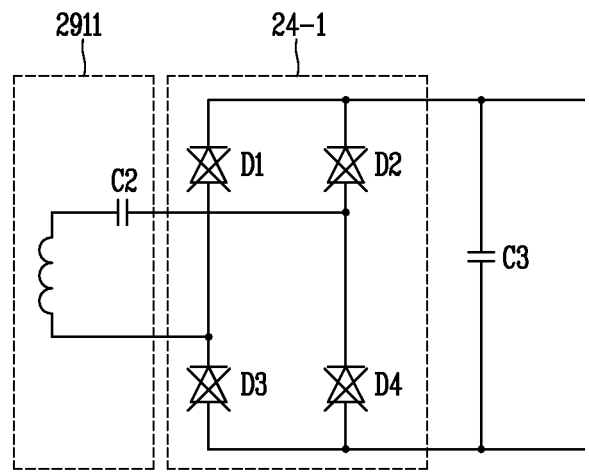
FIG. 24 is an exemplary view illustrating a circuit for setting PT=0.

FIG. 24 is an exemplary view illustrating a circuit for setting PT=0.

As illustrated in FIG. 24, when the wireless power receiver 200 is connected to the wireless power transmitter 100, the transmission control unit 112 periodically turns off diodes (D1-D4) in a rectifier 24-1 connected to a rear end of the LC resonant circuit 2911 of the wireless power receiver 200, thereby setting $P_T=0$. For example, the wireless power receiver 200 opens the rectifier 24-1 based on the control signal (control signal for setting to $P_T=0$) of the transmission control unit 112 to block a current applied to the LC resonant circuit 2911 of the wireless power receiver 200, thereby setting $P_T=0$.

Figure 25:
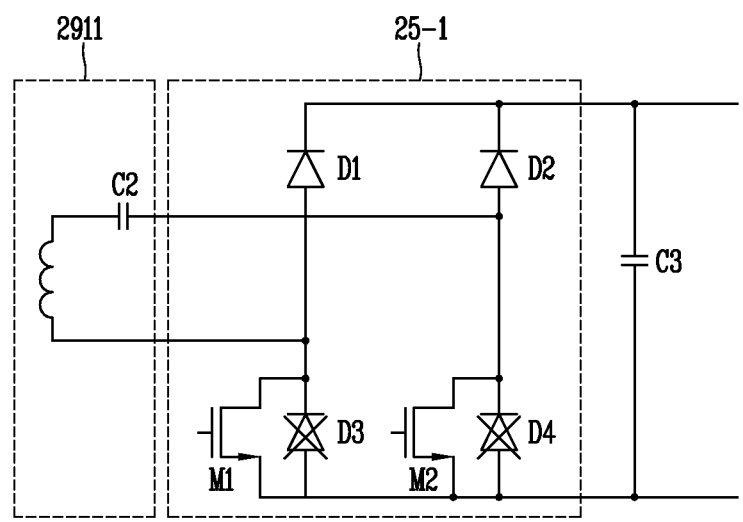
FIG. 25 is an exemplary view illustrating another circuit for setting PT=0.

FIG. 25 is an exemplary view illustrating another circuit for setting PT=0.

As illustrated in FIG. 25, when the wireless power receiver 200 is connected to the wireless power transmitter 100, the transmission control unit 112 periodically short-circuits the LC resonant circuit 2911 of the wireless power receiver 200, thereby setting $P_T=0$. For example, the wireless power receiver 200 turns on switching devices (M1, M2) within the rectifier 25-1 based on the control signal (control signal for setting to $P_T=0$) of the transmission control unit 112 to short-circuit the diodes (D3, D4), thereby short-circuiting the LC resonant circuit 2911 of the wireless power receiver 200.

Figure 26:
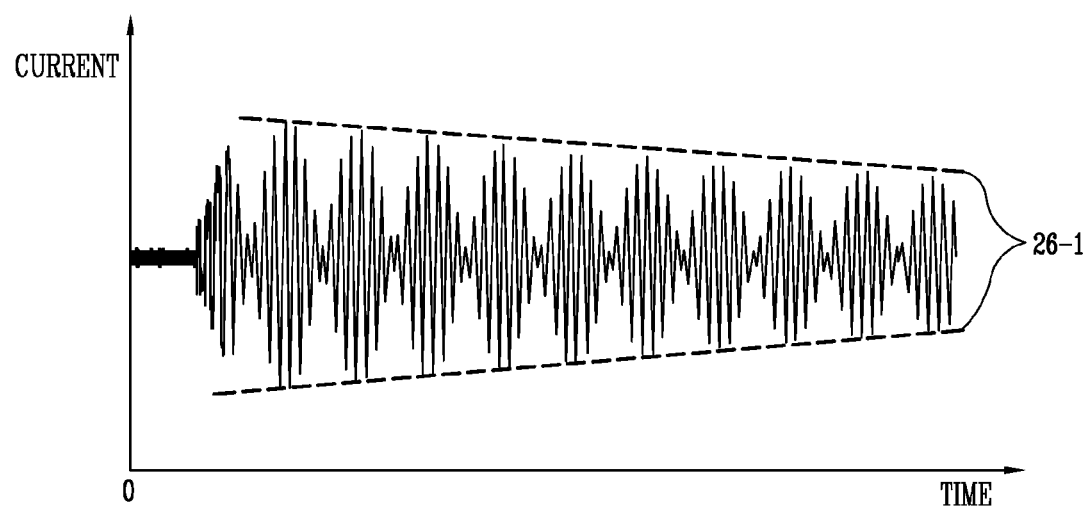
FIG. 26 illustrates an attenuation curve of resonant energy when the operation of an LC resonant circuit of the wireless power transmitter suspends in a state that there exist only the wireless power receiver and the wireless power transmitter without an external metal material.

FIG. 26 illustrates an attenuation curve 26-1 of resonant energy when the operation of an LC resonant circuit of the wireless power transmitter 100 suspends in a state that there exist only the wireless power receiver 200 (in a state that the LC resonant circuit is short-circuited) and the wireless power transmitter 100 without an external metal material 300.

Figure 27:
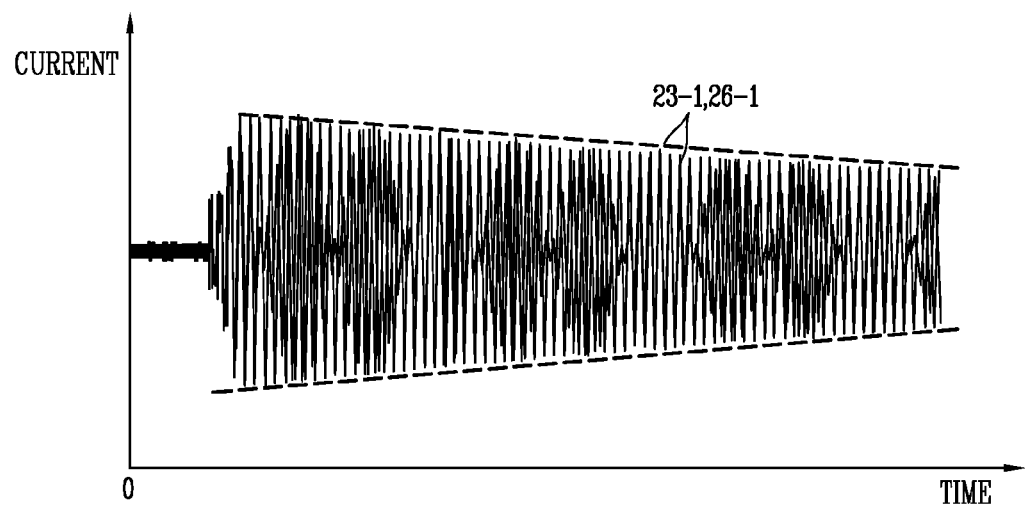
FIG. 27 is a view illustrating a waveform in which a current waveform of FIG. 23 and a current waveform of FIG. 26 overlap.

FIG. 27 is a view illustrating a waveform in which a current waveform of FIG. 23 and a current waveform of FIG. 26 overlap, wherein it is seen that the attenuation curve 23-1 of resonant energy in FIG. 23 and the attenuation curve 26-1 of resonant energy in FIG. 26 are not affected by the existence or non-existence of the wireless power receiver 200 (in a state that the LC resonant circuit is short-circuited). In other words, it is seen that the attenuation factor of resonant energy in FIG. 23 and the attenuation factor of resonant energy in FIG. 26 are not so different from each other.

Figure 28:
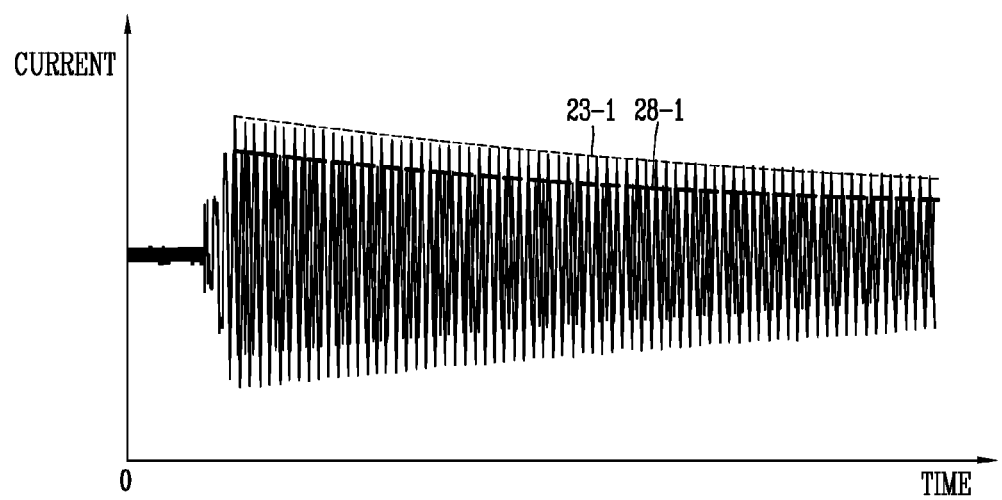
FIG. 28 is an exemplary view illustrating an attenuation curve (attenuation factor) of resonant energy.

FIG. 28 is an exemplary view in which an attenuation curve (attenuation factor) 23-1 of resonant energy when the operation of the LC resonant circuit of the wireless power transmitter 100 suspends in a state that there exists only the wireless power transmitter 100 without the external metal material 300 and an attenuation curve (attenuation factor) 28-1 of resonant energy when the operation of the LC resonant circuit of the wireless power transmitter 100 suspends in a state that the external metal material 300 exists on the wireless power transmitter 100 are compared.

As illustrated in FIG. 28, it is illustrated a change of an inductor coil current which is a representative value indicating resonant energy accumulated in the LC resonant circuit of the wireless power transmitter 100 according to the existence or non-existence of the external metal material 300 when the wireless power transmitter 100 exists alone. In other words, it is seen that the attenuation factor ($\alpha$) of resonant energy is clearly distinguished according to the existence or non-existence of the external metal material 300.

Figure 29:
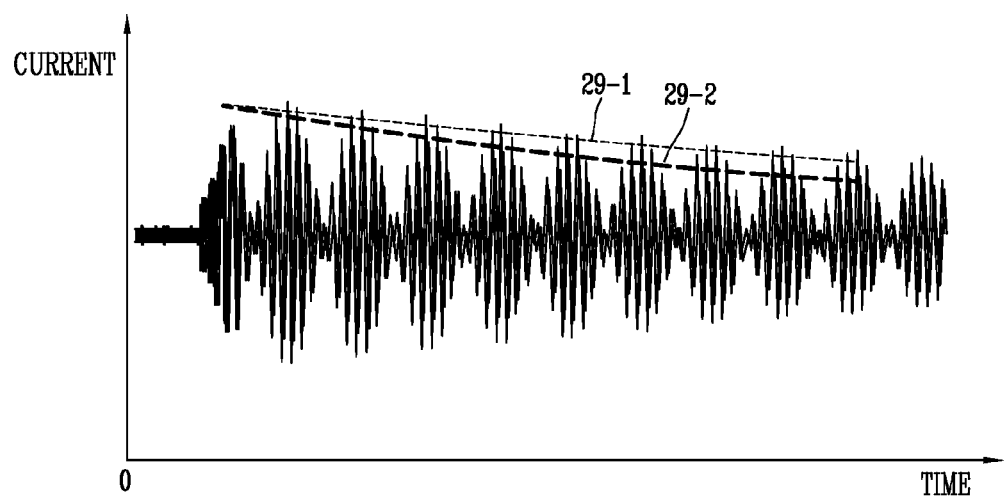
FIG. 29 is another exemplary view illustrating an attenuation curve (attenuation factor) of resonant energy.

FIG. 29 is an exemplary view in which an attenuation curve (attenuation factor) 29-1 of resonant energy when the operation of the LC resonant circuit of the wireless power transmitter 100 suspends in a state that the wireless power receiver 200 is located at the wireless power transmitter 100 without the external metal material 300 and an attenuation curve (attenuation factor) 29-2 of resonant energy when the operation of the LC resonant circuit of the wireless power transmitter 100 suspends in a state that the wireless power receiver 200 is located at the wireless power transmitter 100 and the external metal material 300 exists on the wireless power transmitter 100 are compared. In other words, it is seen that the attenuation factor ($\alpha$) of resonant energy is clearly distinguished according to the existence or non-existence of the external metal material 300.

The transmission control unit 112 may also determine the existence or non-existence of the external metal material based on a number of resonant cycles (or period of time) taken to reduce the envelop of a current (or voltage) of the LC resonant circuit of the wireless power transmitter 100 when the operation of the LC resonant circuit of the wireless power transmitter 100 suspends. The transmission control unit 112 may determine the existence or non-existence of the external metal material based on the envelop size of a current (or voltage) remained in the LC resonant circuit of the wireless power transmitter 100 subsequent to a predetermined number of resonant cycles (or subsequent to a predetermined period of time) when the operation of the LC resonant circuit of the wireless power transmitter 100 suspends.

The transmission control unit 112 may also determine the existence or non-existence of the external metal material based on an attenuation factor of the resonant energy and a predetermined reference attenuation factor (threshold value).

Figure 30:
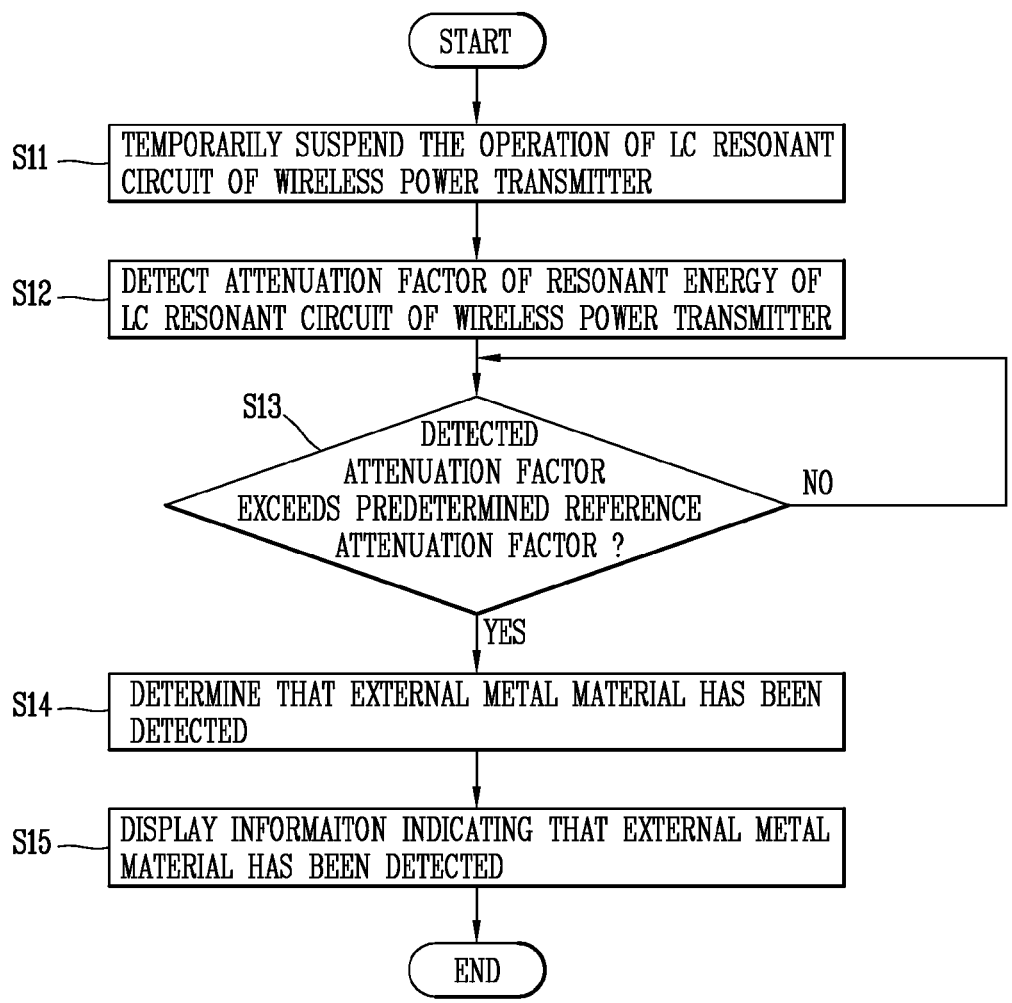
FIG. 30 is a flow chart illustrating a method of determining the existence or non-existence of the external metal material according to an embodiment of the present disclosure.

FIG. 30 is a flow chart illustrating a method of determining the existence or non-existence of the external metal material according to an embodiment of the present disclosure.

First, the transmission control unit 112 temporarily suspends the operation of the LC resonant circuit of the wireless power transmitter 100 in a periodic manner or when a period of time set by the user has passed (S11). For example, the transmission control unit 112 temporarily suspends the operation of the LC resonant circuit of the wireless power transmitter 100 during a period of time for detecting the existence or non-existence of the external metal material 300 (for example, during a period of time from a time point at which the operation of the LC resonant circuit of the wireless power transmitter 100 suspends to a time point at which resonant energy becomes zero) even in a state that the wireless power receiver 200 is not connected to the wireless power transmitter 100.

The transmission control unit 112 detects an attenuation factor of resonant energy of the LC resonant circuit of the wireless power transmitter 100 when the operation of the LC resonant circuit of the wireless power transmitter 100 suspends (S12).

The transmission control unit 112 determines whether or not the detected attenuation factor exceeds a predetermined reference attenuation factor (S13). The transmission control unit 112 temporarily suspends the operation of the LC resonant circuit of the wireless power transmitter 100 when the wireless power transmitter 100 exists alone without the external metal material 300 and the wireless power receiver 200, and then detects an attenuation factor of resonant energy of the LC resonant circuit of the wireless power transmitter 100 in advance, wherein the predetermined reference attenuation factor is defined as the attenuation factor detected in advance.

When the detected attenuation factor exceeds the predetermined reference attenuation factor, the transmission control unit 112 determines that the external metal material 300 is detected (S14).

When the external metal material 300 is detected, the transmission control unit 112 generates information (for example, error code) indicating that the external metal material 300 has been detected, and displays the information on the display unit 141 (S15).

On the contrary, when the detected attenuation factor does not exceeds the predetermined reference attenuation factor, the transmission control unit 112 periodically performs a method of determining the existence or non-existence of the external metal material 300.

Figure 31:
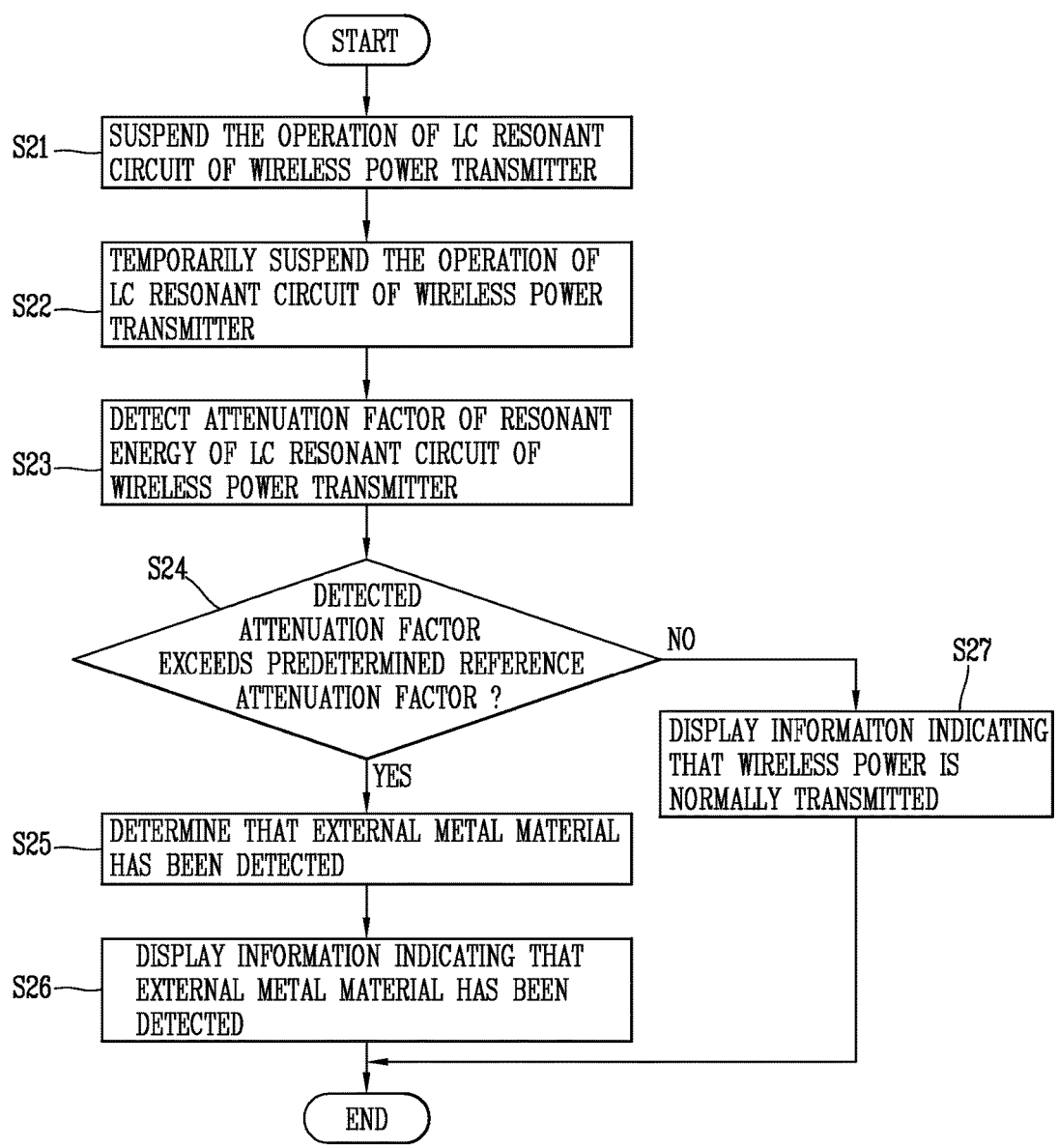
FIG. 31 is a flow chart illustrating another method of determining the existence or non-existence of the external metal material according to an embodiment of the present disclosure.

FIG. 31 is a flow chart illustrating another method of determining the existence or non-existence of the external metal material according to an embodiment of the present disclosure.

First, when the wireless power receiver 200 is connected to the wireless power transmitter 100, the transmission control unit 112 transmits wireless power to the wireless power receiver 200, and then temporarily suspends the operation of the LC resonant circuit of the wireless power receiver 200 in a periodic manner or when a period of time set by the user has passed (S21). For example, when the wireless power receiver 200 is connected to the wireless power transmitter 100, the transmission control unit 112 transmits wireless power to the wireless power transmitter 100, and then temporarily suspends the operation of the LC resonant circuit of the wireless power receiver 200 during a period of time for detecting the existence or non-existence of the external metal material 300.

The transmission control unit 112 suspends the operation of the LC resonant circuit of the wireless power receiver 200, and also temporarily suspends the operation of the LC resonant circuit of the wireless power transmitter 100 (S22).

The transmission control unit 112 temporarily suspends the operation of the LC resonant circuit of the wireless power receiver 200 and the LC resonant circuit of the wireless power transmitter 100, and detects an attenuation factor of resonant energy of the LC resonant circuit of the wireless power transmitter 100 (S23).

The transmission control unit 112 determines whether or not the detected attenuation factor exceeds a predetermined reference attenuation factor (S24). The transmission control unit 112 temporarily suspends the operation of the LC resonant circuit of the wireless power transmitter 100 when the wireless power transmitter 100 is connected to the wireless power receiver 200 without the external metal material 300, and then detects an attenuation factor of resonant energy of the LC resonant circuit of the wireless power transmitter 100 in advance, wherein the predetermined reference attenuation factor is defined as the attenuation factor detected in advance.

When the detected attenuation factor exceeds the predetermined reference attenuation factor, the transmission control unit 112 determines that the external metal material 300 is detected (S25).

When the external metal material 300 is detected, the transmission control unit 112 generates information (for example, error code) indicating that the external metal material 300 has been detected, and displays the information on the display unit 141 (S26).

On the contrary, when the detected attenuation factor does not exceeds the predetermined reference attenuation factor, the transmission control unit 112 displays information indicating that wireless power is normally transmitted to the wireless power receiver 200 on the display unit 141 (S27).

As described above, a wireless power transmitter and a control method thereof according to the embodiments of the present disclosure may detect an attenuation factor of resonant energy of the LC resonant circuit of the wireless power transmitter, thereby determining the existence or non-existence of an external metal material.

As illustrated in the above, a wireless power transmitter and a control method thereof according to the embodiments of the present disclosure may detect an attenuation factor of the LC resonant circuit, thereby determining the existence or non-existence of an external metal material.

Figure 32:
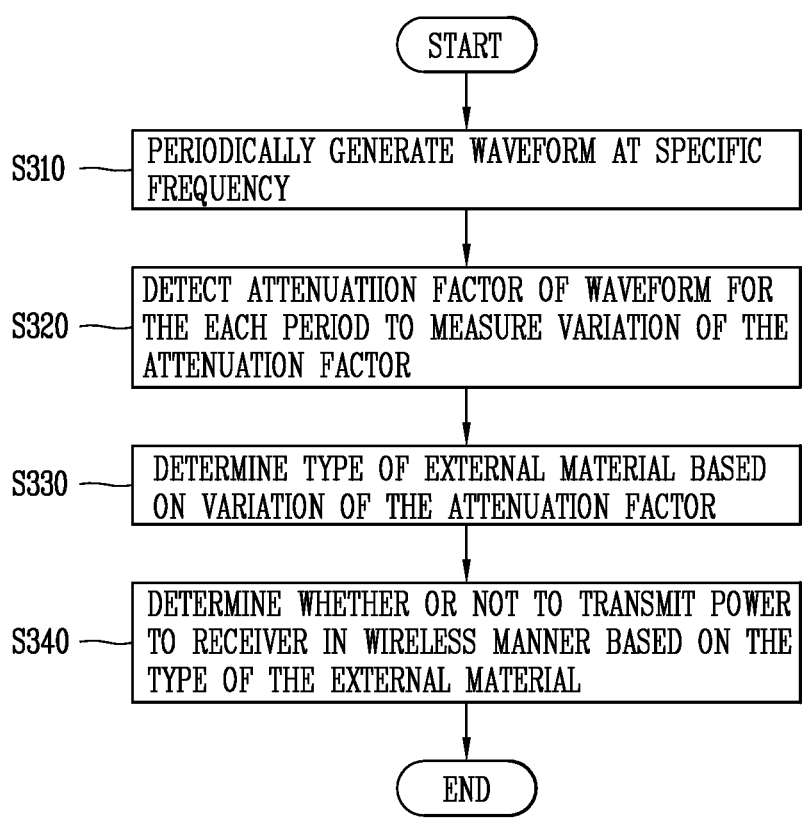
FIG. 32 is a flow chart illustrating a method of detecting a type of external material, and an alignment state and a capacitance of the receiver based on a change rate for each period of an attenuation factor.
Figure 35:
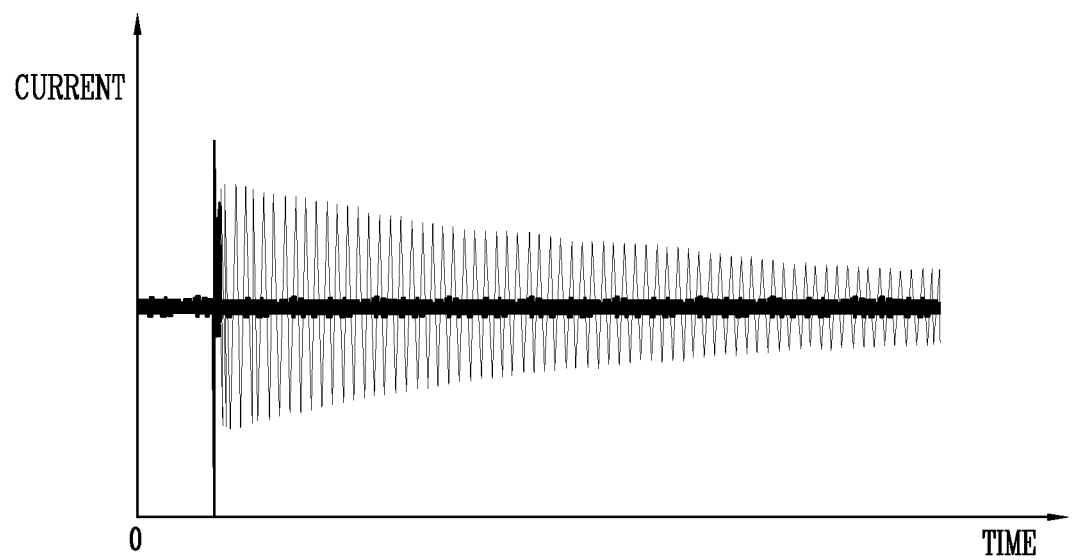
FIGS. 35, 36 and 37 are graphs illustrating a change of an attenuation factor according to the type of an external material.
Figure 36:
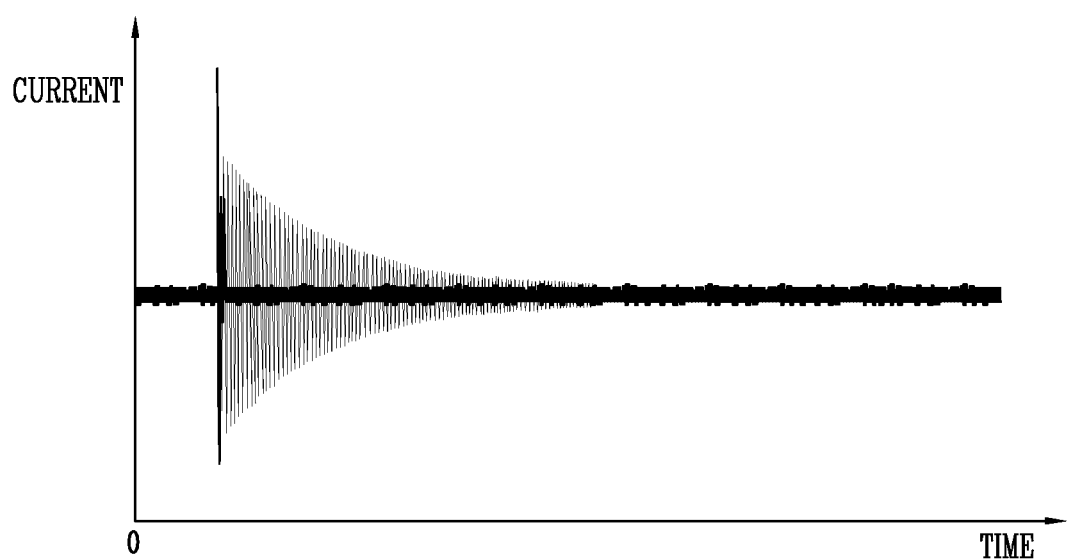
Figure 37:
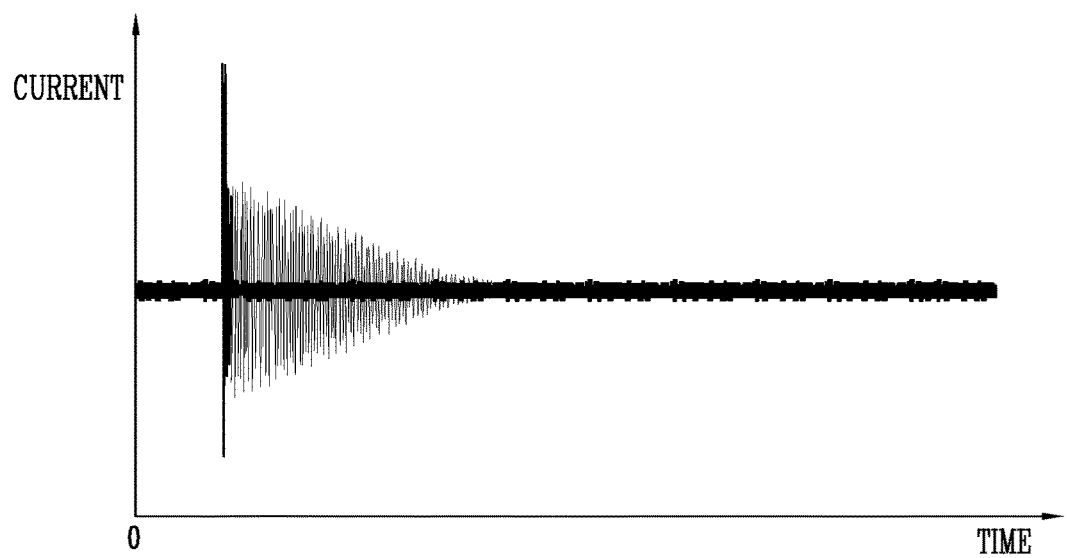
Figure 38:
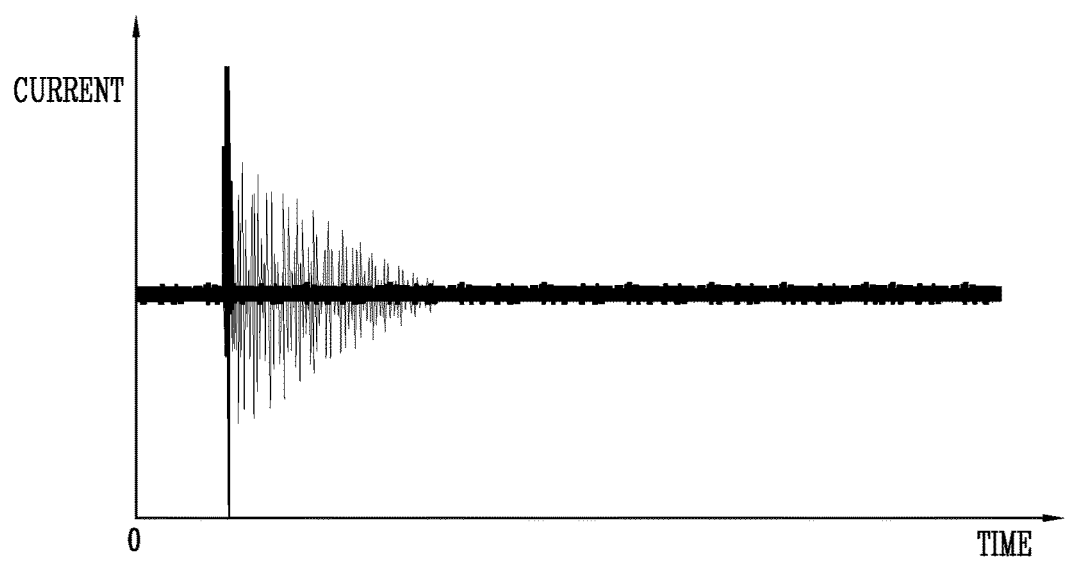
FIGS. 38, 39 and 40 are graphs illustrating a change of an attenuation factor for each period when there is a receiver.
Figure 39:
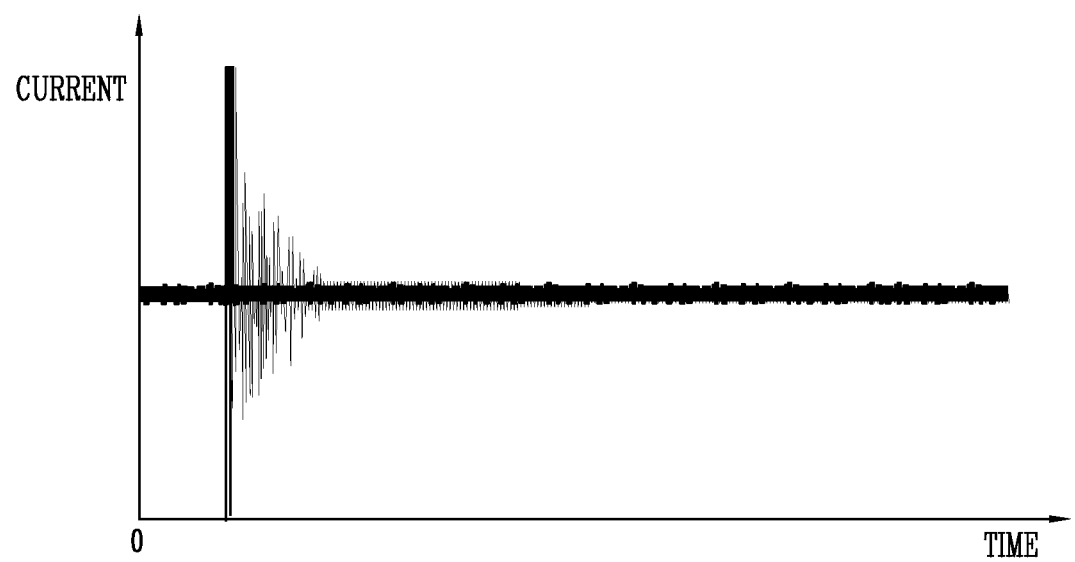
Figure 40:
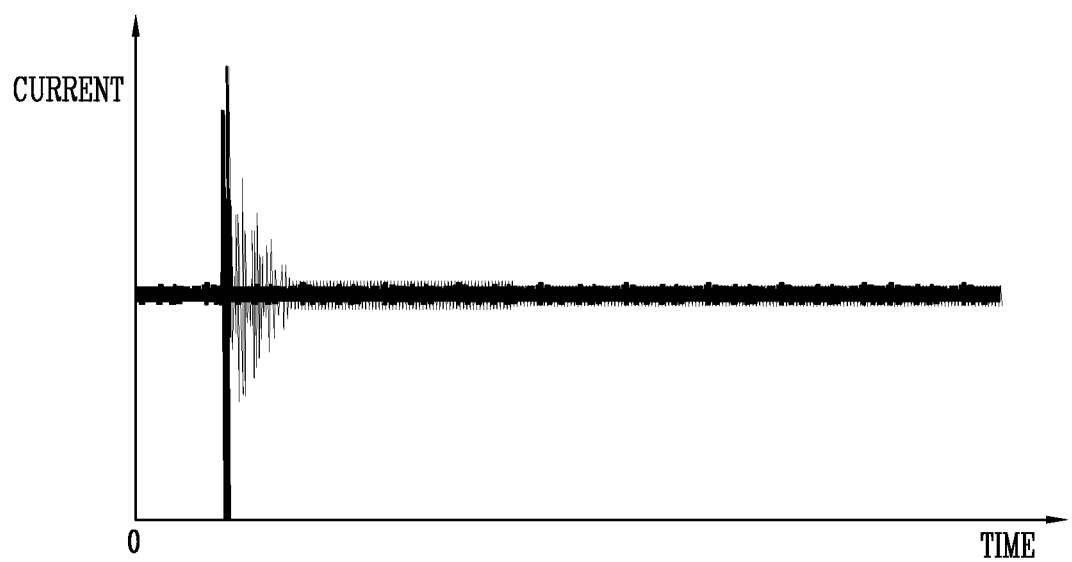

Hereinafter, a wireless power transmitter according to the embodiments of the present disclosure describes a method of detecting a type of external material, and an alignment state and a capacitance of the receiver based on a change rate for each period of the attenuation factor. FIG. 32 is a flow chart illustrating a method of detecting a type of external material, and an alignment state and a capacitance of the receiver based on a change rate for each period of an attenuation factor, and FIGS. 35, 36 and 37 are graphs illustrating a change of an attenuation factor according to the type of an external material, and FIGS. 38, 39 and 40 are graphs illustrating a change of an attenuation factor for each period when there is a receiver.

A wireless power transmitter according to an embodiment of the present disclosure may carry out the process of generating a waveform at a specific frequency to detect an external material (S310).

The wireless power transmitter may detect whether or not there exists an external material capable of receiving power in a wireless manner within a specific distance capable of transmitting the wireless power. Here, detecting whether or not there exists the external material is to prevent a case of transmitting wireless power though any material inappropriate for wireless charging is aligned. If wireless power is transmitted to a material inappropriate for wireless charging, then it may create a concern of damaging the wireless charging system.

At this time, in order to determine whether or not the external device is a device of receiving power in a wireless manner, the transmission control unit 112 provided in the wireless power transmitter may periodically generate a waveform having a specific frequency.

Here, the specific frequency may be a frequency higher than an inherent resonant frequency of the wireless power transmitter.

On the other hand, for a waveform having the specific frequency, the characteristics of the waveform may be changed when an external material exists within a specific distance based on the wireless power transmitter. Here, the characteristics of the waveform may be a frequency, an attenuation factor or the like of the waveform.

At this time, a wireless power transmitter according to an embodiment of the present disclosure may carry out the process of detecting an attenuation factor of the waveform for each period of the waveform to measure a variation of the attenuation factor (S320).

The transmission control unit 112 may detect an attenuation factor for each period of the waveform.

At this time, the attenuation factor of the waveform may vary according to the existence or non-existence of an external material within a specific distance based on the wireless power transmitter. Here, a specific distance set based on the wireless power transmitter may denote a distance capable of allowing the wireless power transmitter to transmit power in a wireless manner. Referring to the graphs of FIGS. 35, 36 and 37, it is seen that the attenuation factor varies within a period according to the existence or non-existence of an external material.

More specifically, the graph of FIG. 35 illustrates a waveform of a coil for power transmission provided in the wireless power transmitter when there exists no external material within a specific distance of the wireless power transmitter. Furthermore, the graph of FIG. 36 illustrates a waveform of a coil for power transmission provided in the wireless power transmitter when there exists an external material within a specific distance of the wireless power transmitter. When the graphs of FIGS. 35 and 36 are compared, it is seen that the attenuation factor varies when there exists an external material.

Moreover, the graph of FIG. 37 illustrates a waveform of a coil for power transmission provided in the wireless power transmitter when there exists a receiver capable or receiving wireless power within a specific distance of the wireless power transmitter. When FIGS. 35, 36 and 37 are compared, it is seen that the attenuation factor varies. Furthermore, due to the existence of the receiver in FIG. 37, it is seen that there is a waveform having an additional frequency.

Through this, the transmission control unit 112 may determine the existence or non-existence of an external material. Through this, the present disclosure may control wireless power to be transmitted only when the external material exists within a specific distance capable of transmitting wireless power, thereby protecting the wireless charging system.

Subsequent to measuring a variation of the attenuation factor, the wireless power transmitter may determine the type of an external material based on a variation of the attenuation factor of the waveform (S330).

The transmission control unit 112 may determine the type of an external material based on a variation of the attenuation factor for each period as well as the existence or non-existence of the external material. The variation of the attenuation factor according to the period may be caused by a capacitor provided in the rectifier unit of the receiver receiving wireless power.

More specifically, a capacitor provided in the rectifier unit of the receiver may store energy due to a waveform having a specific frequency transmitted from the transmitter. At this time, a voltage of the capacitor provided in the rectifier unit of the receiver increases by the stored energy. Due to this, a ratio of voltage/current applied to the capacitor varies, and an equivalent resistance indicated by the capacitor varies, and an equivalent resistance of the entire receiver system varies. Accordingly, due to a change of an equivalent resistance of the capacitor provided in the receiver, the attenuation factor of a waveform sensed at the power transmission unit coil (coil of the LC resonant circuit) of the transmitter may vary.

The transmission control unit 112 may detect a variation of attenuation factors for each period. More specifically, referring to FIGS. 38, 39 and 40, it is seen that the attenuation factor for each period for one waveform gradually decreases.

More specifically, FIG. 38 illustrates an attenuation factor for a first period of the waveform, and FIG. 39 illustrates an attenuation factor for a second period of the waveform, and FIG. 40 illustrates an attenuation factor for a third period of the waveform. As shown in FIGS. 38 through 40, it is seen that the attenuation factor of the waveform gradually decreases.

A variation of attenuation factor may vary according to the type of an external material. For example, a variation of attenuation factor between a receiver of wireless power and an external device incapable of receiving wireless power may vary.

Through this, the transmission control unit 112 may detect the type of an external material based on a variation of the attenuation factor. More specifically, when a variation of the attenuation factor corresponds to a preset reference variation, the transmission control unit 112 may detect a receiver formed to receive wireless power.

Subsequent to detecting the external material, a wireless power transmitter according to an embodiment of the present disclosure may carry out the process of determining whether or not to transmit power to the external material in an wireless manner based on the type of the external material (S340).

The transmission control unit 112 may determine whether or not the external material is a receiver capable of receiving power in a wireless manner. At this time, when the external material is a receiver capable of receiving power in a wireless manner, the transmission control unit 112 may control the power supply unit 190 to transmit power to the receiver. Furthermore, when the external material is a receiver incapable of receiving power in a wireless manner, the transmission control unit 112 may control the power supply unit 190 not to transmit power to the receiver.

Furthermore, the transmission control unit 112 may detect the type of the external material based on a waveform, which is detected from the coil for power transmission, having an additional frequency different from a resonant frequency of the wireless power transmitter.

For example, the transmission control unit 112 may detect a waveform having an additional frequency different from an inherent resonant frequency basically provided by the wireless power transmitter for a frequency of a waveform sensed at the coil for power transmission.

Here, the additional frequency value may be a value depending on a mutual inductance value between coils provided in the transmitter and receiver, respectively. At this time, since the additional frequency value depends on a mutual inductance value, the transmission control unit 112 may determine an alignment state between the transmitter and the receiver based on the additional frequency value. The alignment state may denote a state in which the transmitter is placed at a location that is suitable for transmitting power to the receiver in a wireless manner.

Moreover, the transmission control unit 112 may deduce a capacitance of the capacitor of the receiver as well as the alignment state using a waveform having the additional frequency. More specifically, the transmission control unit 112 may deduce a capacitance of the capacitor of the receiver using the mutual inductance value and additional frequency value. Through this, the transmission control unit 112 may determine an amount of wireless power to be transmitted to the receiver.

Furthermore, an additionally detected frequency may vary according to the type of the external material. For example, since the structure of kitchen appliances and heating devices including a motor is different from that of a receiver receiving wireless power, a different frequency may be detected on a coil for power transmission of the transmitter. As a result, the transmission control unit 112 may detect the type of an external material using the characteristics of detecting the different frequency. Through this, the transmission control unit 112 may control the power supply unit 190 to transmit wireless power according to the characteristics of the receiver.

As described above, a wireless power transmitter according to an embodiment of the present disclosure may determine a type of the receiver and an alignment state of the receiver as well as a capacitance of the receiver using at least one of a variation of attenuation factor of a waveform and a waveform having an additional frequency.

In the above, a method of allowing a wireless power transmitter to detect the type of an external material has been described. Through this, the wireless power transmitter may distinguish a wireless power receiver without any additional communication with the wireless power receiver. Moreover, the present disclosure may provide a method of determining the type of an external material adjacent to the wireless power transmitter to transmit suitable wireless power.

On the other hand, in transmitting wireless power, a current several watts class wireless power transmission system uses in-band communication in which a coil for power transmission is used for communication to share information between the transmitter and receiver.

However, the coil for power transmission is not suitable for a wireless power transmission system transmitting several kilowatts class power since large power flows therethrough. The reason is that an absolute amount of lost power is very large even though a very small reduction of power efficiency for communication occurs when the coil for power transmission is used for communication. Furthermore, the cost of devices used for nodes to which large power is applied is also high, and thus there may be difficulties in using a coil transmitting large power for communication.

Accordingly, a method of using an additional communication module in a wireless power transmission system transmitting and receiving a power of several kilowatts is proposed. A communication method using such an additional communication module may be referred to as out-of-band communication.

On the other hand, in using the additional communication module, when a method for securing one-to-one communication between the transmitter and receiver and a method of safely suspending communication the transmitter and receiver are separated may be a problem.

Figure 33:
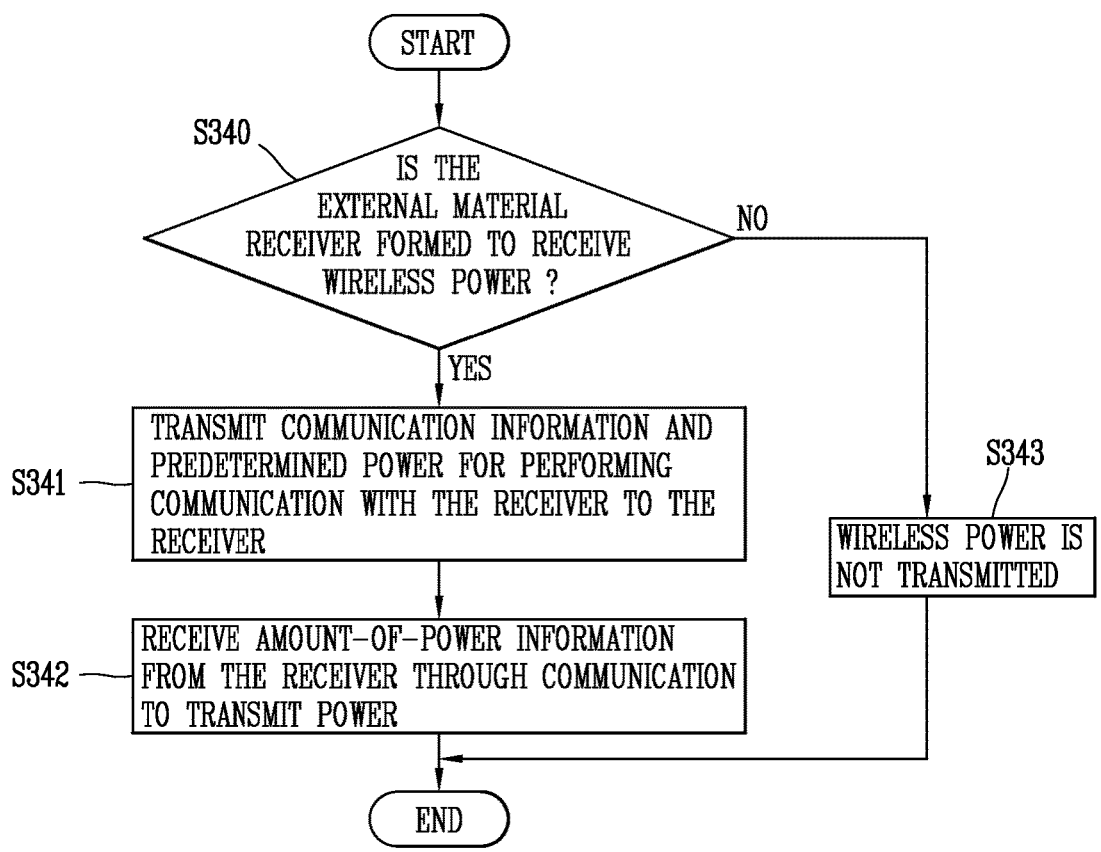
FIG. 33 is a flow chart illustrating a method of performing communication in a wireless power transmitter according to an embodiment of the present disclosure.

Hereinafter, in order to solve the foregoing problem, a method of allowing a wireless power transmitter according to an embodiment of the present disclosure to perform communication with an external material will be described. FIG. 33 is a flow chart illustrating a method of performing communication in a wireless power transmitter according to an embodiment of the present disclosure.

At this time, prior to performing the communication, the transmission control unit 112 may first perform the process of detecting the type of the external material (S340). The process of detecting the type of the external material may be carried out similarly to the foregoing description.

When the external material is a receiver formed to receive wireless power, the transmission control unit 112 may control the wireless communication unit to perform communication prior to transmitting power to the receiver in a wireless manner.

In other words, a wireless power transmitter according to an embodiment of the present disclosure may carry out the process of transmitting communication information required to perform the communication to the receiver and predetermined power to the receiver (S341). Here, the communication information may be identification information (for example, SSID), security information and the like.

Furthermore, the predetermined power may be a power required to drive the wireless communication unit provided in the receiver. Here, the predetermined amount of power may be a preset amount. Furthermore, the predetermined power may be used to drive the wireless communication unit, and then used for the receiver afterwards when predetermined power is remained.

Furthermore, the power transmission control unit 180 may transmit the communication information and predetermined power using a frequency higher than an inherent resonant frequency of the transmitter. For example, the power transmission control unit 180 may transmit communication information and predetermined power using two frequencies f1, f2 higher than the resonant frequency.

At this time, the power transmission control unit 180 is able to transmit the communication information and predetermined power without any feedback of the receiver. Moreover, the receiver that has received the communication information and predetermined power may perform amplitude demodulation using different amplitudes of the two frequencies f1, f2, and analyze a signal through frequency demodulation when amplitude demodulation is difficult.

Through this, the transmitter and receiver may perform one-to-one communication using the demodulated signal.

A wireless power transmitter according to an embodiment of the present disclosure may perform the communication, and then transmit power to the receiver in a wireless manner (S342). At the same time, the present disclosure may control the power supply unit 190 not to transmit power in a wireless manner when the external material is not a receiver (S343).

When communication is connected, the power transmission control unit 180 may receive amount-of-power information on power to be received from the receiver through communication. Then, the transmission control unit 112 may transmit power to the receiver in a wireless power based on the amount-of-power information.

In the above, a method of communicating between the wireless power transmitter and receiver has been described. Through this, the wireless power transmitter may guarantee one-to-one communication between the transmitter and receiver even when transmitting a power of several kilowatts.

Figure 34:
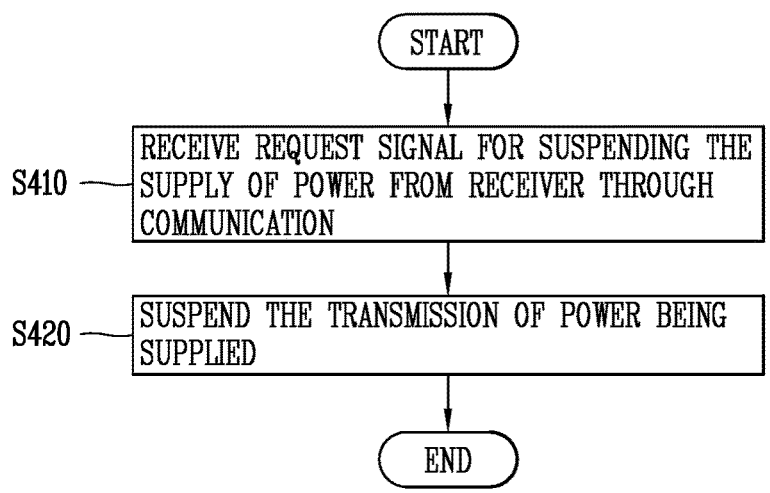
FIG. 34 is a flow chart illustrating a method of suspending the transmission of power in a wireless manner.

Hereinafter, a method of suspending the transmission of wireless power while the wireless power transmitter transmits power to the wireless power receiver in a wireless manner will be described. FIG. 34 is a flow chart illustrating a method of suspending the transmission of power in a wireless manner.

A wireless power transmitter according to an embodiment of the present disclosure may receive a request signal for suspending the supply of power from the receiver through communication while transmitting power to the receiver in a wireless manner (S410).

The communication may be carried out through a communication method described above in FIG. 33, and the transmission of the wireless power may be carried out a method described above in FIG. 32.

The request signal may include alignment state information indicating that the alignment state of the receiver has been changed. For example, the request signal may include information indicating that the receiver is currently in a state incapable of receiving wireless power from the transmitter.

The receiver may transmit a request signal for suspending the supply of the power to the wireless power transmitter based on a preset condition.

Here, the preset condition may be at least one of a condition in which a voltage of a capacitor provided in the rectifier unit of the receiver drops below a reference value, a condition in which a voltage falling duration time of a capacitor provided in the rectifier unit is above a reference time, and a condition in which a current value flowing through a coil provided in the receiver drops below a reference value.

In other words, when at least one of the preset conditions is satisfied, the receiver may transmit a request signal to the transmitter to suspend the supply of power being transmitted in a wireless manner.

At this time, when the request signal is received, a wireless power transmitter according to an embodiment of the present disclosure may suspends the transmission of power currently being supplied (S420).

When the request signal is received through communication, the transmission control unit 112 may suspend the transmission of power that has been transmitted to the receiver. At this time, the transmission control unit 112 may determine that the alignment state of the receiver has been changed. In other words, in this case, the transmission control unit 112 may suspends the transmission of power being transmitted to the receiver not to transmit unnecessary power.

On the other hand, even though the reception of power from the transmitter is suspended, the communication may not be disconnected. Through this, the transmitter may still transmit and receive information from the receiver.

A wireless power transmitter and a control method thereof according to the embodiments of the present disclosure may detect an attenuation factor of resonant energy of the LC resonant circuit of the wireless power transmitter, thereby determining the existence or non-existence of an external metal material.

A wireless power transmitter and a control method thereof according to the embodiments of the present disclosure may control the wireless power receiver to allow the wireless power receiver to block the reception of the wireless power, and detect an amount of power consumed by an external metal material based on a total amount of lost power of the wireless power transmitter and an inherent amount of lost power of the wireless power transmitter detected at a time point at which the LC resonant circuit of the wireless power transmitter is driven and then suspended.

A wireless power transmitter and a control method thereof according to the embodiments of the present disclosure may determine the type of an external material using a variation of frequency attenuation factor of a waveform sensed at a coil for power transmission of the wireless power transmitter.

A wireless power transmitter and a control method thereof according to the embodiments of the present disclosure may detect an alignment state and a capacitance of an external material using an additional waveform other than an inherent resonant frequency, which is sensed at a coil for power transmission of the wireless power transmitter.

A wireless power transmitter and a control method thereof according to the embodiments of the present disclosure may provide a method of connecting one-to-one communication between the wireless power transmitter and the wireless power receiver. Through this, the present disclosure may provide a method of safely performing communication.

The foregoing method may be implemented in a recording medium readable by a computer or its similar devices by employing, for example, software, hardware or some combinations thereof.

For a hardware implementation, the embodiments described herein may be implemented by using at least any one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein. For example, the foregoing methods may be implemented by the controller 180 or power transmission control unit 112 in the wireless power transmitter 100.

For a software implementation, the embodiments such as procedures and functions disclosed herein may be implemented with separate software modules. Each of the software modules may perform one or more of the functions and operations described herein. Software codes may be implemented by using a software application written in a suitable programming language. The software codes may be stored in the memory 150 in the wireless power transmitter 100, and implemented by the controller 180 or the power transmission control unit 112.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

The scope of the invention will not be limited to the embodiments disclosed herein, and thus various modifications, variations, and improvements can be made in the present invention without departing from the spirit of the invention, and within the scope of the appended claims.

What is claimed is:

1. A wireless power transmitter capable of transmitting and receiving power in a wireless manner, the wireless power transmitter comprising:
   a power supply unit configured to supply power to transmit power to a receiver in a wireless manner; and
   a power transmission control unit configured to:
      periodically generate a signal having a waveform at a first frequency for each period, wherein the first frequency is different from a preset resonant frequency between the wireless power transmitter and the receiver;
      measure a variation of an attenuation factor of the generated signal for the each period;
      detect a second frequency included in the generated signal, wherein the second frequency is different from each of the first frequency and the preset resonant frequency, and wherein the second frequency is related to a mutual inductance value between the wireless power transmitter and the receiver;
      determine a type of an external material corresponding to the receiver and an alignment state between the wireless power transmitter and the receiver based on the measured variation of the attenuation factor and the detected second frequency; and
      transmit power to the receiver in the wireless manner based on the determined type of the external material and alignment state.

2. The wireless power transmitter of claim 1, wherein the power transmission control unit determines the external material as the receiver that receives power in the wireless manner to transmit power to the receiver in a wireless manner when the variation of the attenuation factor corresponds to a preset reference variation.

3. The wireless power transmitter of claim 2, further comprising:
   a wireless communication unit formed to perform communication with the receiver in a wireless manner,
   wherein the power transmission control unit transmits a preset amount of power and control information associated with communication to the receiver to perform communication through the wireless communication unit when the external material is a receiver that is capable of receiving the wireless power.

4. The wireless power transmitter of claim 3, wherein the power transmission control unit transmits power to the receiver in a wireless manner when one-to-one communication with the receiver is completed.

5. The wireless power transmitter of claim 4, wherein the power transmission control unit receives amount-of-power information on wireless power to be received from the receiver through the connected communication to control the power supply unit so as to supply power based on the amount-of-power information.

6. The wireless power transmitter of claim 1, wherein the power transmission control unit detects a capacitance of the external material based on the measured variation of the attenuation factor.

7. A wireless charging system, comprising:
   a transmitter formed to transmit power in a wireless manner; and
   a receiver formed to receive wireless power from the transmitter,
   wherein the transmitter comprises:
      a power supply unit configured to supply power to transmit power to the receiver in a wireless manner; and
      a power transmission control unit configured to:
         periodically generate a signal having a waveform at a first frequency for each period, wherein the first frequency is different from a preset resonant frequency between the transmitter and the receiver;
         measure a variation of an attenuation factor of the generated signal for the each period;
         detect a second frequency included in the generated signal, wherein the second frequency is different from each of the first frequency and the preset resonant frequency, and wherein the second frequency is related to a mutual inductance value between the transmitter and the receiver;
         determine a type of an external material corresponding to the receiver and an alignment state between the transmitter and the receiver based on the measured variation of the attenuation factor and the detected second frequency; and
         transmit power to the receiver in the wireless manner based on the determined type of the external material and alignment state.

8. The wireless charging system of claim 7, wherein:
   the transmitter further comprises a wireless communication unit formed to perform communication with the receiver in a wireless manner; and
   the power transmission control unit transmits communication information and a preset amount of power to the receiver to perform communication with the receiver in a wireless manner prior to transmitting power to the receiver in a wireless manner.

9. The wireless charging system of claim 8, wherein the power transmission control unit transmits the communication information and preset amount of power using a frequency higher than a resonant frequency of the transmitter.

10. The wireless charging system of claim 8, wherein when communication is connected to the receiver based on the communication information, the power transmission control unit controls the power supply unit to transmit power based on an amount of power received from the receiver through the communication.

11. The wireless charging system of claim 10, wherein when a request signal for suspending power transmission is received from the receiver, the power transmission control unit controls the power supply unit to suspend the power being transmitted.

12. The wireless charging system of claim 11, wherein the receiver generates the request signal based on at least one of a voltage value, a voltage drop time, or a current value of the receiver.

13. A wireless power transmission method of a wireless power transmitter for transmitting power in a wireless manner, the wireless power transmission method comprising:
- periodically generating a signal having waveform at a first frequency, wherein the first frequency is different from a preset resonant frequency between the wireless power transmitter and the receiver;
- measuring a variation of an attenuation factor of the generated signal for the each period;
- detecting a second frequency included in the generated signal, wherein the second frequency is different from each of the first frequency and the preset resonant frequency, and wherein the second frequency is related to a mutual inductance value between the wireless power transmitter and the receiver;
- determining a type of an external material corresponding to the receiver and an alignment state between the wireless power transmitter and the receiver based on the measured variation of the attenuation factor and the detected second frequency; and
- transmitting power to the receiver in the wireless manner based on the determined type of the external material and alignment state.

14. The wireless power transmission method of claim 13, wherein said transmitting power to the receiver in a wireless manner suspends the transmission of the power based on a request signal for suspending the transmission of power that is received from the receiver through the communication.

* * * * *